United States Patent
Doan

(10) Patent No.: US 7,203,387 B2
(45) Date of Patent: Apr. 10, 2007

(54) VLSI-PHOTONIC HETEROGENEOUS INTEGRATION BY WAFER BONDING

(75) Inventor: My The Doan, Singapore (SG)

(73) Assignee: Agency For Science, Technology and Research, Singapore (SG)

( * ) Notice: Subject to any disclaimer, the term of this patent is extended or adjusted under 35 U.S.C. 154(b) by 174 days.

(21) Appl. No.: 10/822,201

(22) Filed: Apr. 9, 2004

(65) Prior Publication Data

US 2005/0053319 A1    Mar. 10, 2005

Related U.S. Application Data

(60) Provisional application No. 60/501,669, filed on Sep. 10, 2003.

(51) Int. Cl.
  *G02B 6/12* (2006.01)
  *G02B 6/43* (2006.01)
  *H01L 21/50* (2006.01)

(52) U.S. Cl. .............. 385/14; 385/51; 385/91; 438/107

(58) Field of Classification Search .............. None
See application file for complete search history.

(56) References Cited

U.S. PATENT DOCUMENTS

| | | | | |
|---|---|---|---|---|
| 6,020,624 | A | 2/2000 | Wood et al. | 257/618 |
| 6,455,398 | B1 | 9/2002 | Fonstad, Jr. et al. | 438/459 |
| 6,456,767 | B2 | 9/2002 | Terashima | 385/49 |
| 6,741,778 | B1 * | 5/2004 | Chan et al. | 385/52 |
| 6,935,792 | B2 * | 8/2005 | Saia et al. | 385/92 |
| 6,984,544 | B2 * | 1/2006 | Cloud et al. | 438/107 |
| 2002/0076130 | A1 | 6/2002 | Pandraud | 385/14 |
| 2002/0171077 | A1 | 11/2002 | Chu et al. | 257/19 |
| 2003/0002809 | A1 | 1/2003 | Jian | 385/73 |
| 2003/0091264 | A1 | 5/2003 | Kimerling | 385/14 |

(Continued)

FOREIGN PATENT DOCUMENTS

WO    WO 02/48765 A1    6/2002

OTHER PUBLICATIONS

Kitigawa et al., "Hybrid Integration Technologies Using Planar Lightwave Circuits and Developed Components", IEICE Trans. Electron, vol. E85-C, No. 4, Apr. 2002, pp. 1009-1017.

(Continued)

*Primary Examiner*—Omar Rojas
(74) *Attorney, Agent, or Firm*—Saile Ackerman LLC; Stephen B. Ackerman; Rosemary L. S. Pike

(57) ABSTRACT

A new method to form a VLSI-photonic heterogeneous system device is achieved. The method comprises providing an optical substrate comprising at least one passive optical component formed therein. An electronic substrate is provided comprising at least one active electronic component formed therein. A plurality of metal pillars are formed through the optical substrate and protruding out a first surface of the optical substrate. A plurality of metal pads are formed on a first surface of the electronic substrate. The optical substrate and the electronic substrate are bonding together by a method further comprising aligning the first surfaces of the optical and electronic substrates such that the protruding metal pillars contact the metal pads. The optical and electronic substrates are then thermally treated such that the metal pillars bond to the metal pads.

69 Claims, 14 Drawing Sheets

U.S. PATENT DOCUMENTS

2003/0140317 A1    7/2003    Brewer et al. .................. 716/1

OTHER PUBLICATIONS

Worhoff et al., "Design, Tolerance Analysis, and Fabrication of Silicon Oxynitride Based Planar Optical Waveguides for Communication Devices", Jrnl. of Lightwave Tech., vol. 17, No. 8, Aug. 1999, pp. 1401-1407.

Akahori et al., "Assembly and Wiring Technologies on PLC Platforms for Low-Cost and High-Speed Applications", Proceedings of ECTC, 1997, pp. 632-637.

Rich et al., "Monolithically Integrated SiGe-Si PIN-HBT Front-End Photoreceivers," IEEE Photonics Tech. Letters, vol. 10, No. 3, Mar. 1998, pp. 415-417.

Bio-Otp Electronic Sensor Systems (BOSS) Center, DARPA Optoelectronics Research Center, published on web site: www.micro.uiuc.edu/boss/TaskII.html, "Task II: Development of an Integrated Guided-Wave Interferometer-based Bio-Sensor System", no date.

\* cited by examiner

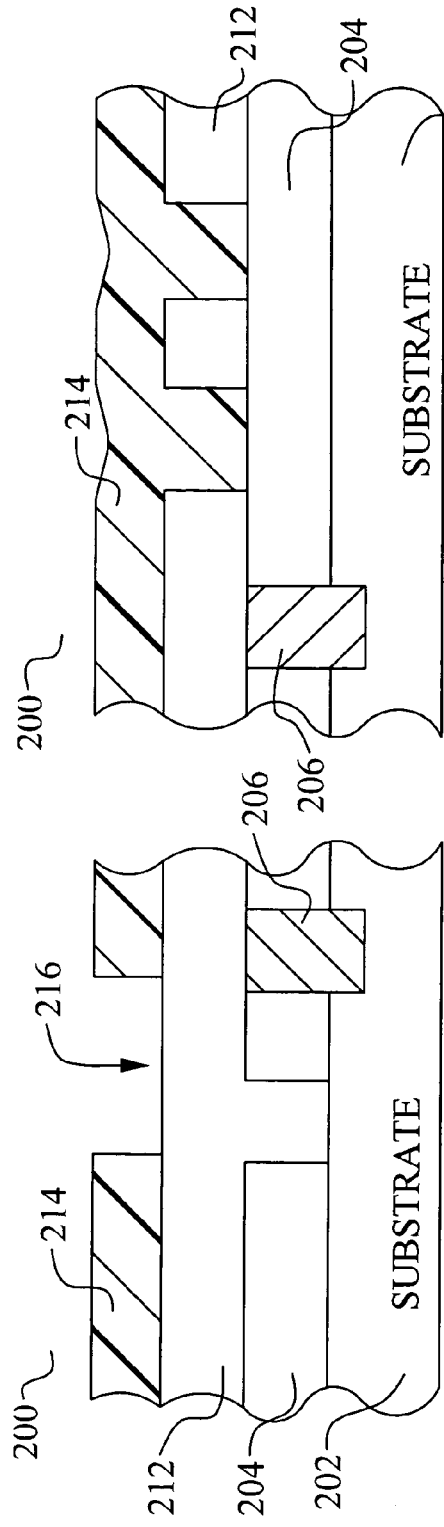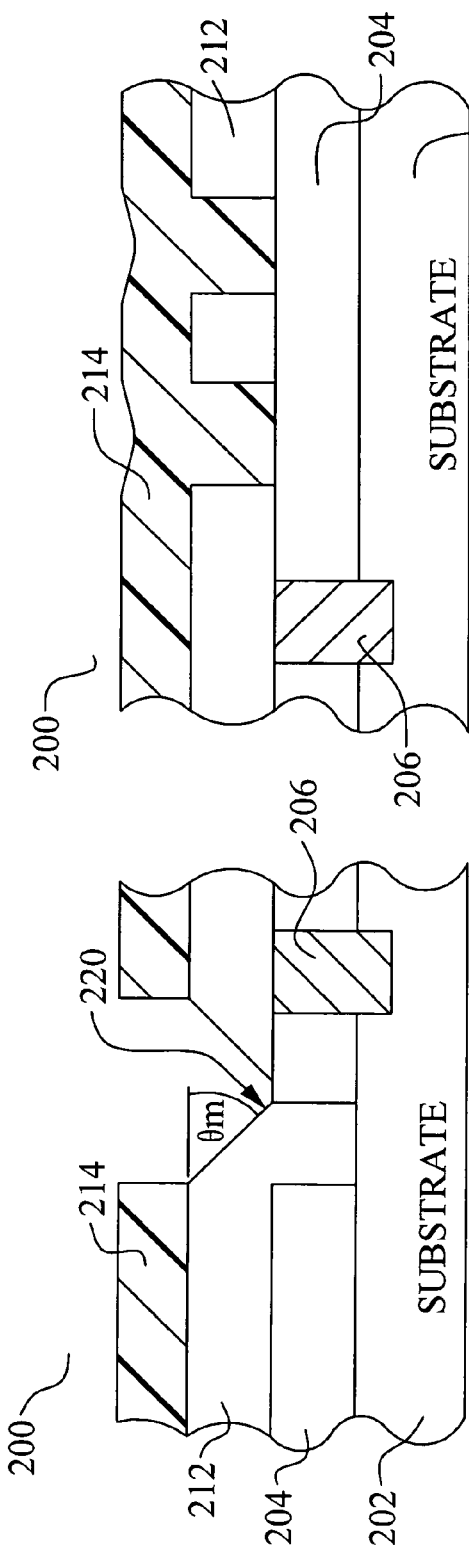
FIG. 22a  FIG. 22b  FIG. 23a  FIG. 23b

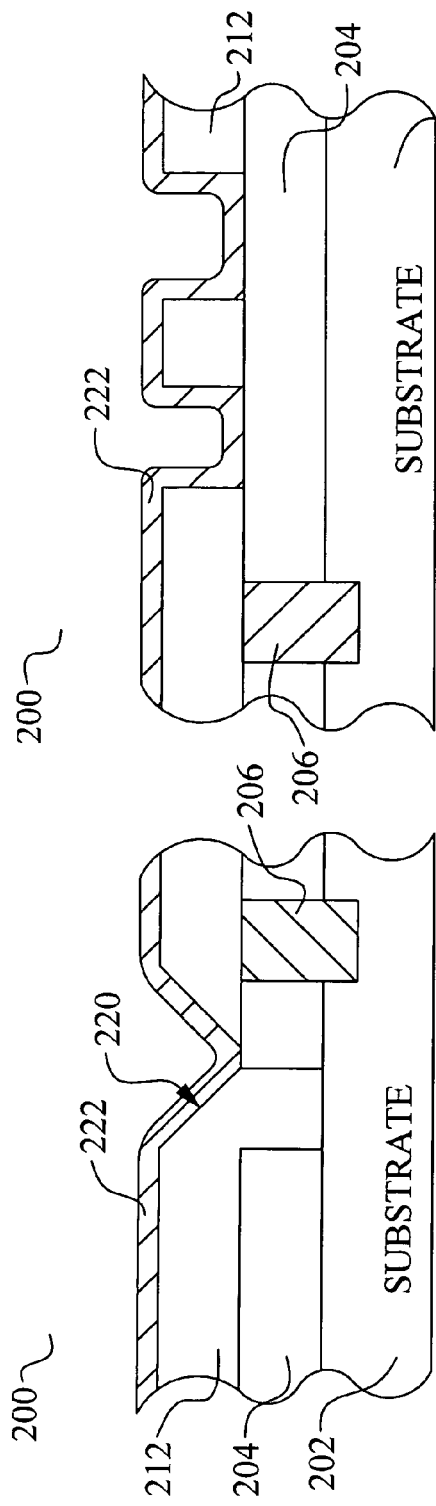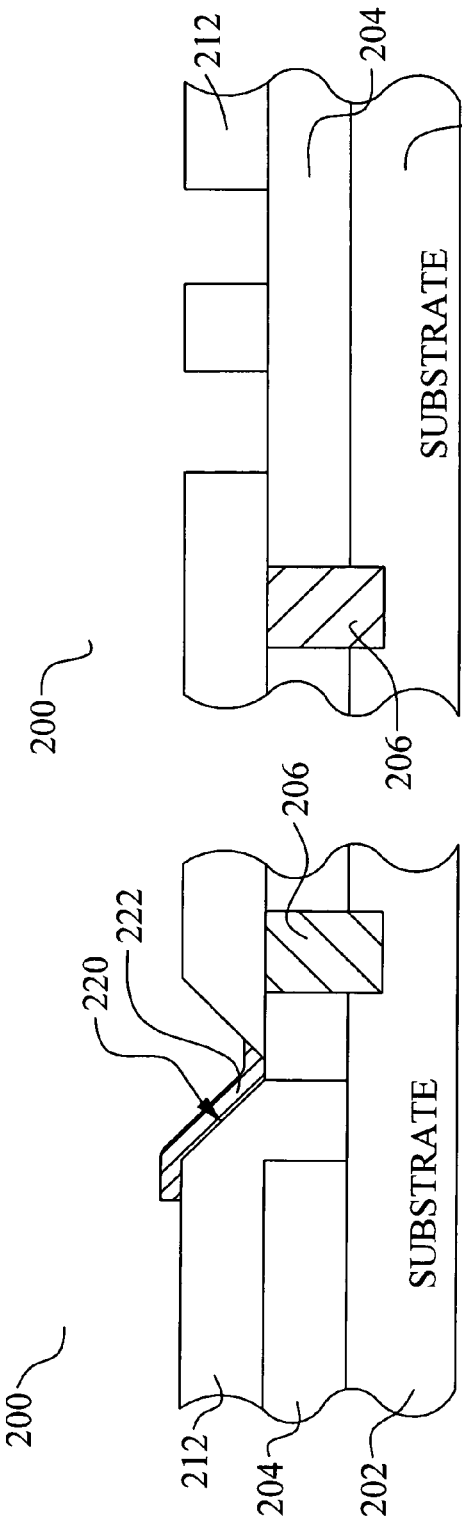
FIG. 24a
FIG. 24b
FIG. 25a
FIG. 25b

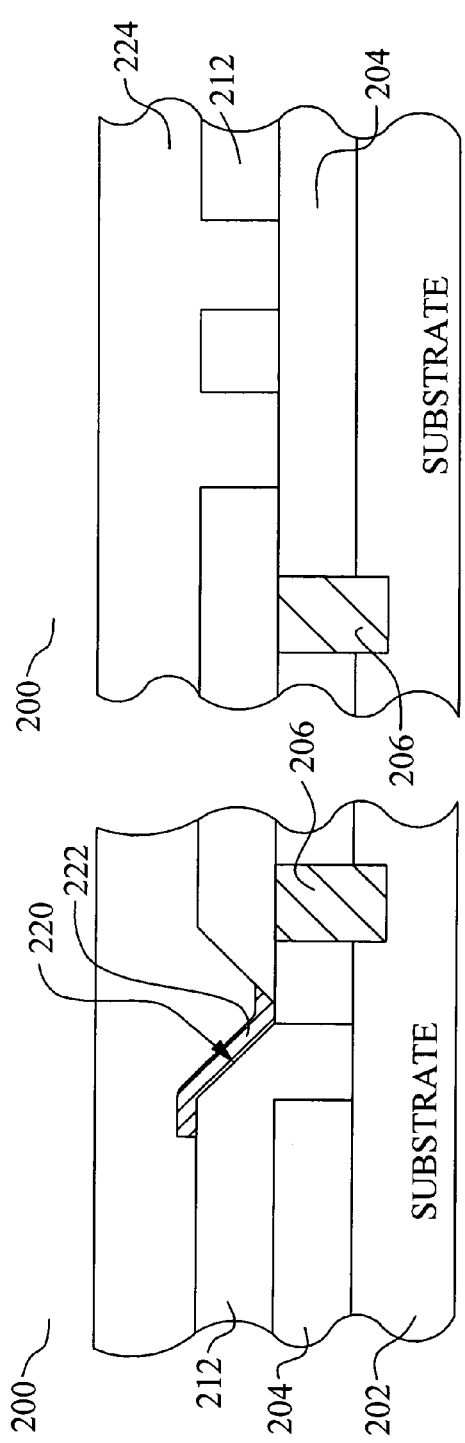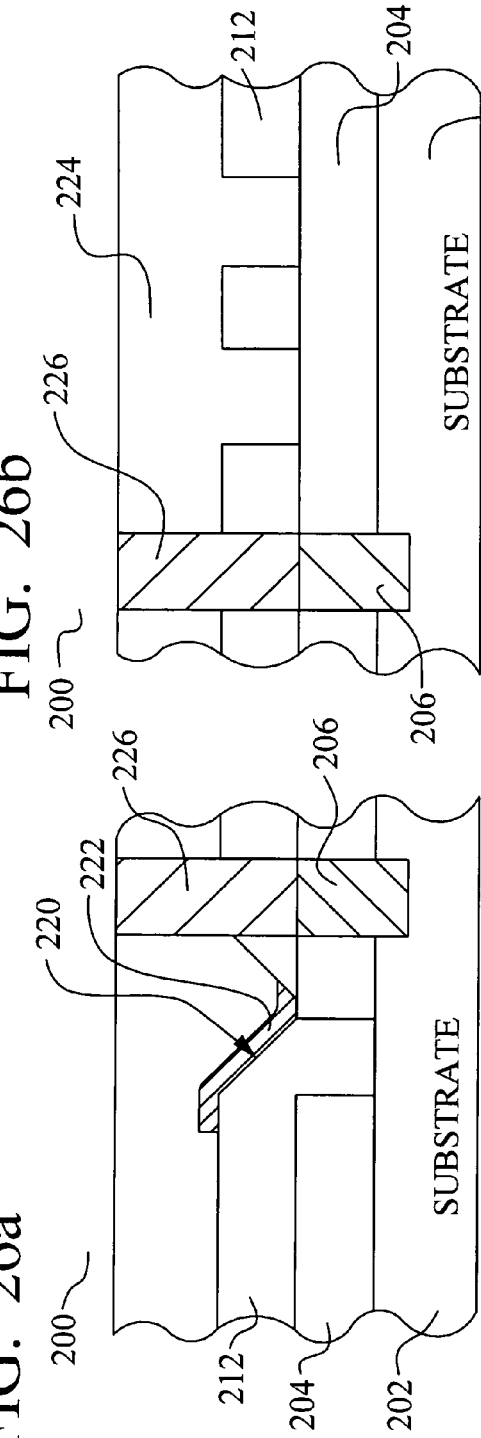

VLSI-PHOTONIC HETEROGENEOUS INTEGRATION BY WAFER BONDING

This application claims priority to U.S. Provisional Application Ser. No. 60/501,669 filed on Sep. 10, 2003, herein incorporated by reference.

BACKGROUND OF THE INVENTION (1) Field of the Invention

The invention relates to the integration of optical and electronic chips, and, more particularly, to a method to form a hybrid, VLSI-photonic integrated circuit using wafer bonding.

(2) Description of the Prior Art

In optical modules for access and metropolitan networking, several requirements are anticipated in the future. In particular, it is anticipated that transmitters, fibers, regenerators, switches, and receivers will become highly integrated components at distribution nodes. Very low cost, plug-and-play systems, such as transmitters and receivers, optical network units (ONU), and optical termination lines (OTL) operating at frequencies in excess of 10 Gigabits/second will be required.

The current state of the art in heterogeneous integration is the silicon (Si) optical bench. On a silicon optical bench, various components, such as laser diodes, photodetectors, waveguides, and VLSI chips, are each picked, aligned, placed, and bonded onto a silicon substrate using flip chip technology and, more particularly, using solder bumps. These silicon bench modules thereby offer both optical signal and electrical signal processing functions on the same silicon substrate.

The optical performance of an optical transceiver is sensitive to the accuracy of the alignments between optical components such as between the fiber and the waveguide, between the waveguide and the laser, and between the waveguide and the photodetector. For example, in the reference by Kitagawa et al, "Hybrid Integration Technologies Using Planar Lightwave Circuits and Developed Components," IEICE Trans. Electron., Vol. E85-C, No. 4, April 2002, p. 1009, it is found that the average optical signal loss for a single laser beam at a spot size converter to a planar waveguide interface is about 4.5 dB. Without the spot size converter, the loss increases to about 7 dB. In addition, it is found that silicon is a lossy substrate. For example, electrical interconnects, such as metal lines, become transmission lines at frequencies above 2 GHz. Further, such metal lines exhibit high propagation loss at frequencies above about 10 GigaHertz. As a notable application, optical transceivers, such as transimpedance amplifiers, clock data recovery circuits, multiplexers, and demultiplexers, have many clock and data lines running at or above 10 GHz. In such an application, the high propagation loss of the silicon substrate is a significant problem.

As for passive optical components, currently, silica-based materials, such as silicon oxynitride, silicon nitride, germanium-doped silicon oxide, or silicon-rich oxide, require high temperature annealing. For example, annealing at temperatures of greater than about 700° C. is required to form silica-based, passive optical components exhibiting low propagation loss of less than about 2 dB/cm as described in Worhoff et al, "Design, Tolerance Analysis, and Fabrication of Silicon Oxynitride Based Planar Optical Waveguides for Communication Devices," Journal of Lightwave Technology, Vol. 17, No. 8, August 1999, p. 1401. The requirement for high temperature processing prevents monolithic integration of passive optical components with electronics chips. This high temperature processing effects transistor characteristics, increases contact resistance, and can melt metal interconnect layers.

Several prior art inventions relate to multiple substrate devices and optical devices. International Patent Application 02/48765 A1 to Pandraud et al and U.S. Patent Application 2002/0076130 A1 to Pandraud show methods to form features within substrates by bonding two substrates together. A waveguide structure with a reflective facet is shown. U.S. Patent Application 2003/0091264 A1 to Kimerling describes a hybrid device comprising an optical chip and an electronic chip. The two chips are bonded together using solder bumps. U.S. Pat. No. 6,455,398 B1 to Fonstad, Jr., et al discloses a method to form a hybrid integrated circuit device by bonding together a silicon wafer and a III-V semiconductor wafer, such as a GaAs wafer. Dielectric layers overlying the surfaces of each wafer are bonded together by a two step sequence comprising pressure and thermal processing. Embodiments describe thinning the silicon substrate such that a thin Si layer overlies then bonded dielectric layers which, in turn, overlie the III-V substrate. Electronics are formed in the Si layer and optoelectronics are formed in the III-V semiconductor layer. U.S. Pat. No. 6,456,767B2 to Terashima shows an optical waveguide transmitter/receiver module. The module comprises a silicon substrate that is bonded together. The bonding surfaces are held together by resin, solder, or similar means. U.S. Application 2003/0140317 A1 to Brewer et al discloses various techniques for combining or for stacking substrates of differing composition. U.S. Patent Application 2003/0002809 A1 to Jian teaches an optical device where fibers are vertically integrated through the substrate layers. U.S. Pat. No. 6,020,624 to Wood et al describes a method to bond wafers together in a memory device. U.S. Patent Application 2002/0171077 to Chu et al teaches a silicon and silicon germanium optoelectronic integrated circuit.

Additional references related to the present invention include the article, by Akahori et al, "Assembly and Wiring Technologies on PLC Platforms for Low Cost and High Speed Applications," Proceeding of ECTC, 1997, p. 632, and the article by Rieh et al, "Monolithically Integrated SiGe—Si PIN-HBT Front-End Photoreceivers," IEEE Photonics Technology Letters, Vol. 10, No. 3, March 1998, p. 415. In addition, in the Bio-Opto Electronic Sensor Systems (BOSS) Center, a DARPA Optoelectronics Research Center, published on a web site: www.micro.uiuc.edu/boss/TaskI-I.html, the paper "Task II: Development of an Integrated Guided-Wave Interferometer-based Bio-Sensor System," the relates to the topic of bio-sensors based on optical systems but does not disclose how to combine optical (III-V) wafers and silicon wafers.

SUMMARY OF THE INVENTION

A principal object of the present invention is to provide an effective and very manufacturable method to integrate an optical substrate and an electronic substrate.

A further object of the present invention is to provide a method to integrate an optical substrate and an electronic substrate such that a heterogeneous, VLSI-photonic integrated circuit is formed.

A yet further object of the present invention is to provide a heterogeneous, VLSI-photonic integrated circuit comprising complex functions and combining electronic/optic, optic/electronic, optic/optic, and electronic/electronic functions.

A yet further object of the present invention is to provide a method to improve the performance of the electrical interconnects and RF passive devices, such as inductors, through the use of built-in thick dielectric layers after substrates are stacked together.

A yet further object of the present invention is to provide a method to form a waveguide with an embedded mirror in the manufacture of an integrated circuit device.

A yet further object of the present invention is to provide a method to form a multiple level, stacked substrate device.

In accordance with the objects of this invention, a method to form a VLSI-photonic heterogeneous system device is achieved. The method comprises providing an optical substrate comprising at least one passive optical component formed therein. An electronic substrate is provided comprising at least one active electronic component formed therein. A plurality of metal pillars are formed through the optical substrate and protruding out a first surface of the optical substrate. A plurality of metal pads are formed on a first surface of the electronic substrate. The optical substrate and the electronic substrate are bonding together by a method further comprising aligning the first surfaces of the optical and electronic substrates such that the protruding metal pillars contact the metal pads. The optical and electronic substrates are then bonded together through the metal pillars and metal pads using a thermal diffusion metal-to-metal process.

Also in accordance with the objects of this invention, a method to form a waveguide with an embedded mirror in the manufacture of an optical substrate device is achieved. The method comprises forming a cladding layer overlying a silicon layer on an optical substrate. The cladding layer is patterned to form openings through the cladding layer where an embedded mirror is planned. A waveguide layer is deposited overlying the cladding layer and filling the openings, creating a vertical waveguide. The waveguide layer is patterned to define a horizontal waveguide. The patterning forms an angled edge where the waveguide layer is etched through to underlying the cladding layer. A metal layer overlies the waveguide. The metal layer is patterned to remove the metal layer from the waveguide excepting at the angled edge of the waveguide. The metal layer forms an embedded mirror for the waveguide.

Also in accordance with the objects of this invention, a VLSI-photonic heterogeneous system device is achieved. The device comprises an optical substrate comprising at least one passive optical component formed therein. Pluralities of metal pillars are located through said optical substrate and protrude out a first surface of the optical substrate. An electronic substrate comprises at least one active electronic component formed therein. A plurality of metal pads is on a first surface of the electronic substrate. The first surfaces of the optical substrate and the electronic substrate are held together by the bonding between the metal pillars and the metal pads.

Also in accordance with the objects of this invention, a waveguide device with an embedded mirror is achieved. The device comprises a cladding layer overlying a silicon layer on an optical substrate. The cladding layer has openings through to underlying silicon layer. A patterned waveguide layer overlies the cladding layer and partially fills the openings. The patterned waveguide layer has an angled edge in the openings. A metal layer overlies the waveguide only on the angled edge. A second cladding layer overlies the waveguide layer and the metal layer.

BRIEF DESCRIPTION OF THE DRAWINGS

In the accompanying drawings forming a material part of this description, there is shown:

FIGS. 17 through 19, 20a through 27a, and 20b through 27b illustrate a fourth preferred embodiment of the present invention showing a method to form a waveguide with an embedded mirror for changing the direction of light transmitted in the waveguide.

DESCRIPTION OF THE PREFERRED EMBODIMENTS

The preferred embodiments of the present invention disclose methods to form hybrid, optical and electronic integrated circuit devices. An embodiment of the present invention relates to the integration of an optical wafer, or chip, with built-in optical devices such as waveguides or light emitter diodes, with an electronic wafer, or chip, with built-in electronic devices, such as transistors or photodetectors. A wafer bonding process uses thermal diffusion to bond metal to metal and to thereby bond together the optical and electronic substrates. A method to form optical waveguides with embedded mirrors is also disclosed. It should be clear to those experienced in the art that the present invention can be applied and extended without deviating from the scope of the present invention.

Figure 1:
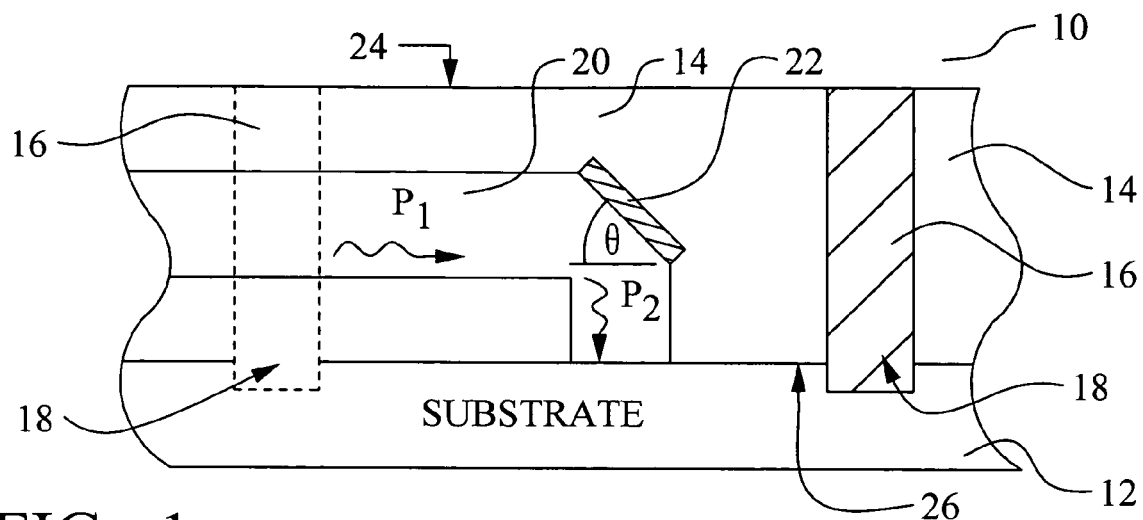
FIGS. 1 through 6 illustrate a first preferred embodiment of the present invention wherein an optical wafer and an electronic wafer are bonded together.
Figure 2:
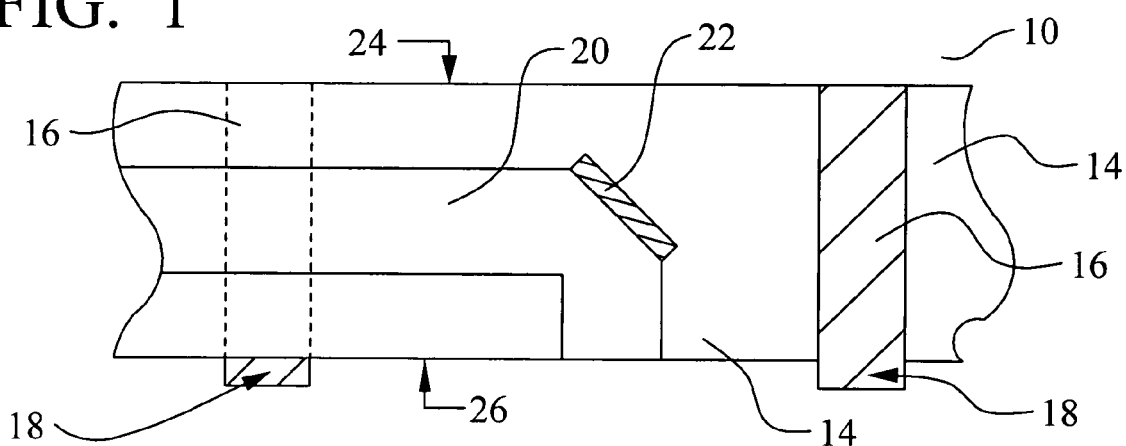
Figure 3:
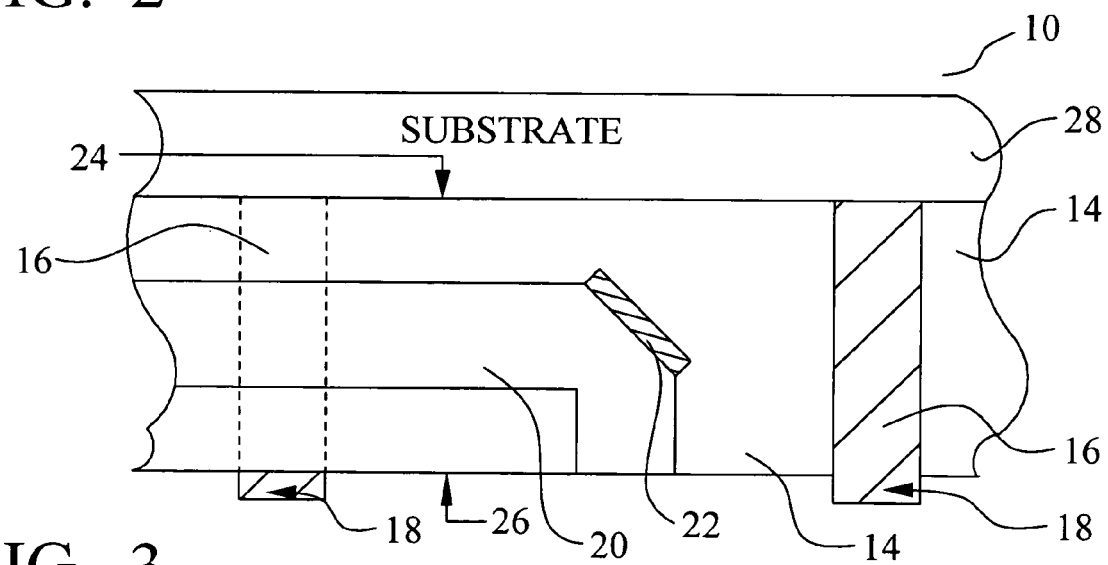
Figure 4:
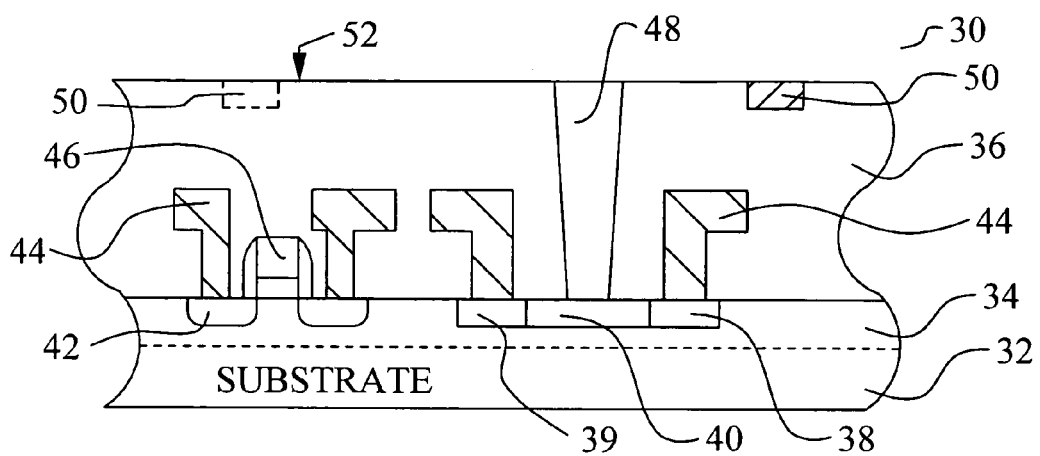
Figure 5:
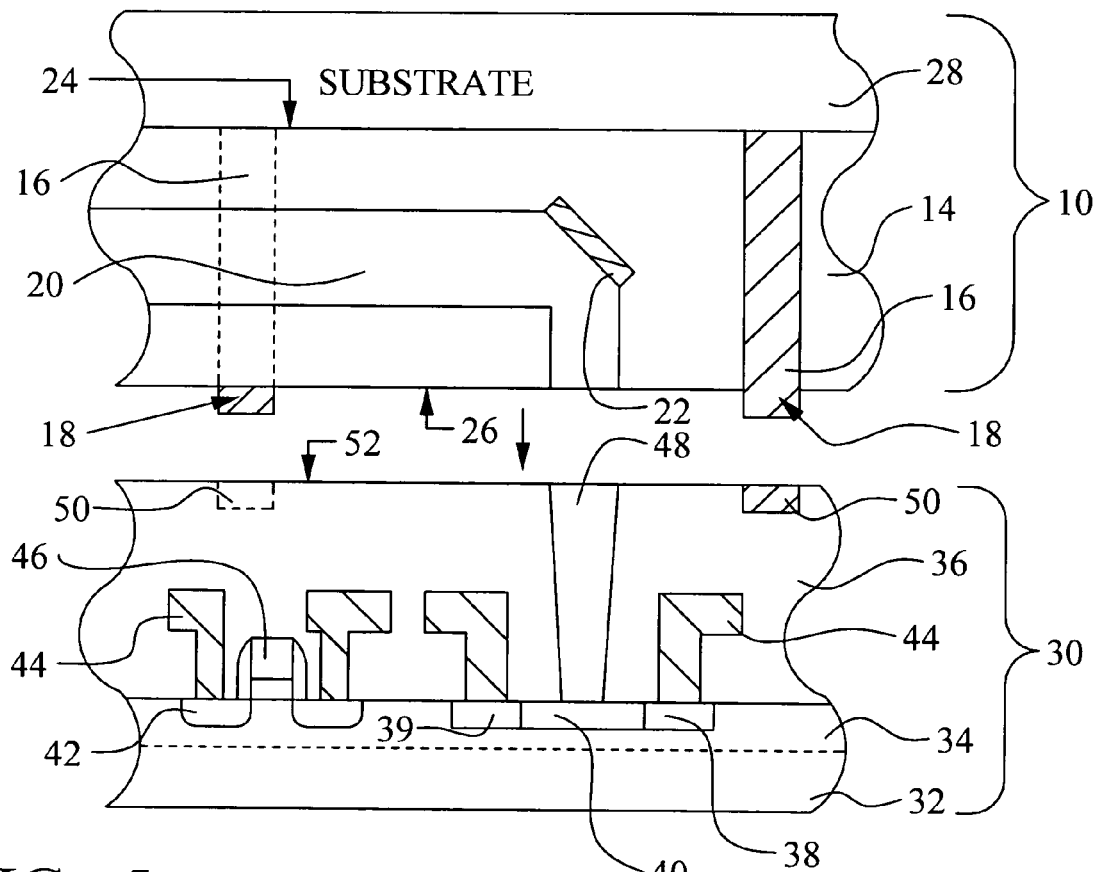
Figure 6:
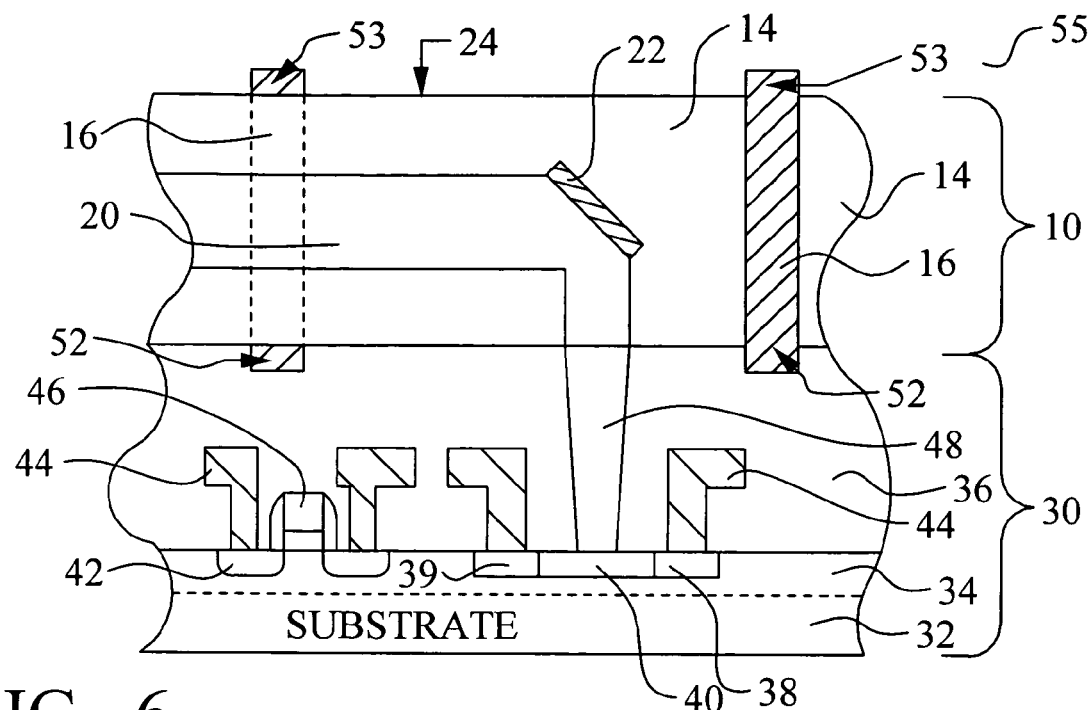

Referring now to FIGS. 1 through 6, a first preferred embodiment of the present invention is illustrated. Several important features of the present invention are shown and discussed below. More particularly, a simplified cross section of an exemplary optical substrate 10 is shown in FIGS. 1 through 3. This optical substrate 10 comprises a passive optical device as will be described below. FIG. 4 illustrates an electronic substrate 30 in a simplified cross section. In FIGS. 5 and 6, the optical substrate 10 and the electronic substrate 30 are bonded together to form a photonic heterogeneous device 55.

Referring again to FIG. 1, the optical substrate 10 is shown. The optical substrate 10 comprises a stack of previously manufactured layers including a first substrate 12, a dielectric layer 14, optical components 20, and metal pillars 16. The optical substrate 10 is preferably a wafer, as is commonly defined in the art, though the optical substrate 10 may alternatively be a single die of a wafer. The optical substrate 10 comprises at least one passive optical component 20. In the exemplary case, a waveguide 20 is formed on the optical substrate 10. The waveguide 20 is formed by methods known in the art. Other optical components that may be formed on the optical substrate 10 include, but are not limited to, branching devices, optical filters, multiplexers, demultiplexers, waveguide optical switches, and waveguide optical amplifiers. Also the optical substrate 10 can contain optical components that made used of photonic bandgap devices such as photonic crystal. In practice, a plurality of optical components is formed in the optical substrate 10. A first substrate 12 is provided. Preferably, the first substrate 12 comprises a semiconductor material such as silicon. However, other materials could be used since the first substrate 12 will be removed in subsequent processing. The optical components 20 and 22 are formed overlying the first substrate 12. More preferably, a dielectric layer 14 is formed overlying the first substrate 12. This dielectric layer 14 may comprise a single layer but, more preferably, comprises a plurality of dielectric layers. A waveguide 20 is formed within the dielectric layer 14. The waveguide comprises a material having a refractive index described by the constant n2. The surrounding dielectric layer 14 has a refractive index described by a constant n1. Here, n2 is greater than n1 such that light that is transmitted through the waveguide 20 will be confined in the waveguide. In this way, the waveguide 20 allows light to be transmitted through the optical substrate 10.

The optical substrate 10 is essentially an analog circuit. Therefore, it is essential to process optical signals while preserving the quality of those optical signal inputs. In order to accomplish these goals, the following requirements must be met in the optical components 20. First, the optical components 20 must exhibit very low propagation loss. Second, there must be high efficient coupling between waveguides 20. Third, there must be sufficient bandwidth in the waveguides 20 and in any wiring or interconnects. Fourth, there must be low residual reflection and crosstalk between and among the waveguides.

To these ends, the waveguide 20 preferably comprises a silica-based material. For example, silicon oxynitride ($SiO_xN_y$), silicon nitride ($Si_xN_y$), germanium doped silicon oxide ($SiO_2$), phosphorous doped silicon oxide, or silicon rich silicon oxide could be used for the waveguide 20. As a general rule, these waveguide materials 20 require high temperature processing. Processing temperatures of in excess of about 700° C. are commonly used for high temperature deposition, such as in low-pressure chemical vapor deposition (LPCVD) or in high temperature annealing. A key advantage of the present invention is the formation of all of the key optical components, such as the waveguides 20, on an optical substrate 10 separate from the electronics components, such as transistors. If the electronics devices and the optical devices are integrated together on a common wafer at this point in the process, then the high temperature, optical processing would adversely affect the performance characteristics of the electronic devices. Other waveguide materials include Si, metal oxides, such as $Al_2O_3$, HfO, $Ta_2O_5$, and the like, and polymer-based materials.

The formation of all of the key optical components in the optical substrate 10 brings an additional key advantage over the prior art. In the prior art silicon bench method, the optical components are individually formed and then placed and bonded onto a silicon substrate using solder bumps. This method suffers the disadvantage of significant coupling losses between optical components due to misalignments of the optical axes or due to gaps between components. In the present invention, very high feature definition and alignment are achieved since all of the optical devices are formed in the same integrated substrate 10.

As an important, but optional, feature, an embedded mirror 22 is formed in the waveguide 20. The embedded mirror 22 comprises a material that is entirely reflective to light transmitting in the waveguide 20. The embedded mirror 22 preferably comprises a metal layer 22. The embedded mirror 22 is formed at an angle θ with respect the lateral plane of the optical substrate 10. More preferably, the embedded mirror 22 is formed at an angle θ of about 45°. In this way, light $P_1$ transmitted laterally in the waveguide 20 and incident on the embedded mirror 22 will be redirected at a right angle as reflected light $P_2$. A preferred method to form a waveguide 20 with an embedded mirror 22 is illustrated in FIGS. 17 through 19, 20a through 27a, and 20b through 27b, and is described in detail in a later section.

Referring again to FIG. 1, another important feature of the present invention is the presence of metal pillars 16. The metal pillars 16 are formed entirely through the dielectric layer 14. The metal pillars 16 are preferably formed after the formation of the optical components 20. The advantage is less processing steps (about 50%) than the process describing in FIG. 17 through 27 therein. Also, high temperature anneal of up to about 1000° C. to reduce propagation loss can be done after the formation of the optical components 20 and before the formation of metal pillars. Hence, high temperature anneal would not affect the metal, i.e. melting. However, the drawback of forming metal pillars after the formation of the optical components is that the thick dielectric layer 14 can be between about 25 to 40 um in depth. As a result, etching the thick dielectric layer is very challenging due to very long etching time of perhaps a few hours. Also the etched openings for the metal pillars would have a tapering profile. That is, the tops of the openings are much larger than the bottoms. Another drawback is less flexibility in the design of said heater which is used in a modulator, interferometer, add-drop multiplexer, etc. Hence, to overcome these drawbacks, an alternative process flow is described in FIG. 17 through 27 therein.

The metal pillars 16 are preferably formed using a damascene process. Preferably, the metal pillars 16 comprise copper metal surrounded by a barrier layer such as tantalum, tantalum nitride, or titanium nitride. The integration of the metal pillar 16 formations and the waveguide 20 and embedded mirror 22 formations is illustrated in FIGS. 17 through 19, 20a through 27a, and 20b through 27b, and is described in detail in a later section.

As a key feature, the metal pillars 16 extend through the dielectric layer 14 from the top surface 24 to the bottom surface 26 of the dielectric layer 14. Further, the metal pillars 16 extend into 18 the underlying first substrate 12. In this way, the metal pillars 16 form a conductive via through the dielectric layer 14 of the optical substrate 10. Preferably, the metal pillars 16 extend into the first substrate 12 between about 0 Å and about 2,000 Å.

Referring now to FIG. 2, the underlying first substrate 12 is removed. By removing the first substrate 12, the portion 18 of the pillars 16 that extend past the bottom surface 26 of the remaining optical substrate 24 is available for bonding with the electronic substrate. The first substrate 12 is preferably removed by a two-part process. First, most of the first substrate 12 is removed to using a backside grinding process. For example, a backside grind may remove the first substrate 12 until about 100 μm remains. Then, referring now to FIG. 3, a second substrate 28 is glued onto the top side 24 of the remaining optical substrate 10. This second substrate 28 acts as a temporary mechanical support for the thin, optical wafer 10. The remaining first substrate 12 is then completely removed using, for example, a wet etch and, more preferably, a spin-etch. An alternative process is a second substrate 28 is glued onto the top side of the optical substrate 10 first, and then is followed by the backside grinding process and wet etch of the Si substrate 12. At this point, the metal pillars 16 will protrude from the bottom side 26 of the dielectric layer 14 of the optical wafer 10. The preliminary processing on the optical wafer 10 is now completed.

Referring now to FIG. 4, the electronics substrate 30 is illustrated in simplified cross section. The electronics substrate 30 comprises a stack of previously manufactured layers including a semiconductor substrate 32 and 34, a dielectric layer 36, electronics components 46, 42, 40, and 38, and metal pads 50. The electronics substrate 30 is preferably a wafer, as is commonly defined in the art, though the electronics substrate 30 may alternatively be a part of a wafer. The semiconductor substrate 32 and 34 may comprise a single material, such as silicon. Alternatively, the semiconductor substrate 32 and 34 may comprise a combination of materials such as in an III-V semiconductor system. In the preferred case, the semiconductor substrate 32 and 34 comprises a monocrystalline germanium layer 34 overlying a monocrystalline silicon layer 32, with or without buffer layers of SiGe between layers 32 and 34.

Various electronics components can be formed on and in the semiconductor substrate 32 and 34 by methods well known in the art. For example, MOS transistors 42 and 46 may be formed. These transistors 42 and 46 may comprise silicon-based, silicon germanium-based, or germanium-based devices as are known in the art. In the exemplary cross section, a MOS gate 46 is formed overlying the germanium semiconductor layer 34 between two doped drain/source regions 42. Another type of device that can be usefully formed in the electronics substrate 30 is the photodetector 38, 39, and 40.

Photodetectors 38, 39, and 40 may comprise silicon-based, silicon germanium-based, or germanium-based devices as are well-known in the art. The photodetector may further comprise a metal-semiconductor-metal (MSM) device or a p-i-n diode device. For example, the photodetector of the exemplary cross section may comprise a p-type region 39, an intrinsic region 40, and an n-type region 38 to thereby form a p-i-n diode. The photodetector may be further integrated with an n-type MODFET, a p-type MODFET, or both types of MODFETs in a CMOS configuration as is described in U.S. Patent Application 2002/0171077 to Chu et al, referenced above. Alternatively, the photodetector can be integrated with a heterogeneous bipolar transistor (HBT) as is described by Rieh et al, referenced above. If a photodetector 38, 39, and 40 is included on the electronics substrate 30, then a vertical waveguide 48 may likewise be included to transmit light to the photodetector device. The vertical waveguide 48 preferably comprises a silica-based material as described above. In addition, metal interconnects 44 are formed as is well known in the art.

In addition to transistors 46 and 42 and photodetectors 38, 39, and 40, as shown, other types of electronic components may be formed on the electronics substrate 30. For example, resistors, varactors, and capacitors, such as are typical to VLSI integrated circuits, may be formed on the electronics substrate 30. The electronics substrate 30 may further comprise optical-electronic transceiver circuits, such as transimpedance amplifiers (TIA), clock data recovery (CDR) circuits, laser driver circuits, modulator drivers circuits, and multiplexer/demultiplexer circuits. In addition, radio frequency (RF) processing circuits, such as Bluetooth, WLAN, or ultra wide band (UWB) circuits or baseband circuits that are digital, memory, A/D, D/A, etc., may be included. Moreover, in the event that substrate 34 is $Si_xGe_y$ or III-V, it is possible a vertical cavity surface emitting laser (VCSEL) can be made and is a component on the electronic substrate.

As another important feature of the present invention, the electronics substrate 30 further comprises metal pads 50. The metal pads 50 comprise a patterned metal layer and, more preferably, comprise copper metal 50 that has been patterned using a damascene process. The copper metal 50 preferably is surrounded by a barrier material such as tantalum, tantalum nitride, or titanium nitride. The metal pad can be made at the same time as the last metal layer of the electronic wafer and can be connected to the lower metal layers through vias.

Referring now to FIG. 5, another important feature in the present invention is illustrated. The optical substrate 10 and the electronics substrate 30 are bonded together to form a single, heterogeneous VLSI/photonic device. The optical substrate 10 and the electronics substrate 30 are aligned with the bottom side 26 of the optical substrate 10 contacting the top side 52 of the electronics substrate 30. Preferably, the optical substrate 10 and the electronics substrate 30 each comprise wafers, as commonly defined in the art, and further comprise alignment marks. The alignment marks on the optical wafer 10 and on the electronics wafer 30 are used to properly align the wafers such that the pillar extensions 18 and the metal pads 50 align and such that optical components, such as the optical waveguide 20 and the vertical waveguide 48 align. A single alignment process, at the wafer-to-wafer level, is used to align all of the circuit die structures on each wafer. This is a very useful feature of the present invention to reduce the cost and time needed to align each final product. In addition, the misalignment problems inherent in the silicon bench approach of the prior art are eliminated. The present invention improves the alignment accuracy of combination optical-electronic circuits through a single step, global alignment of the wafers 10 and 30. This process reduces assembly processing steps and reduces the resulting device footprint when compared to a silicon bench device. In addition, each optical or electronic component, such as a VLSI circuit or a photodetector, does not have to be individually packaged as in the silicon bench approach. Therefore, a large cost savings and a higher performance device are realized.

Referring now to FIG. 6, the optical substrate 10 and the electronics substrate 30 are pressed together after proper alignment. Next, as an important feature of the present invention, the substrate stack 55 is now subjected to a thermal process to bond the metal pillars 16 and the metal pads 50 together to form bonded locations 52. The thermal process preferably comprises a thermal treatment at a temperature of between about 100° C. and about 500° C. This temperature is sufficient to cause copper diffusion at the pillar-pad boundary to thereby create a permanent bond between the substrates 10 and 30 after the thermal cycle is finished. Note that this thermal treatment is performed at a relatively low temperature such that damage or alteration of the electronic components, such as transistor characteristics, does not occur. The completed photonic heterogeneous stack 55 shows a particularly useful configuration where the optical substrate waveguide 20 and the electronics substrate, vertical waveguide 48 are contacted together. This arrangement is useful for transmitting light from the optical substrate 10 down to the photodetector sensing section 40 of the electronics substrate 30. In the thermal diffusion of metal-to-metal, temperature is the most important parameter, but other parameters such as surface cleanliness, force and pressure also contribute to a successful bonding. It is found that a plasma treatment on the copper surface will provide a copper surface cleanliness sufficient to reduce the temperature for wafer bonding down to about 100° C.

Figure 7:
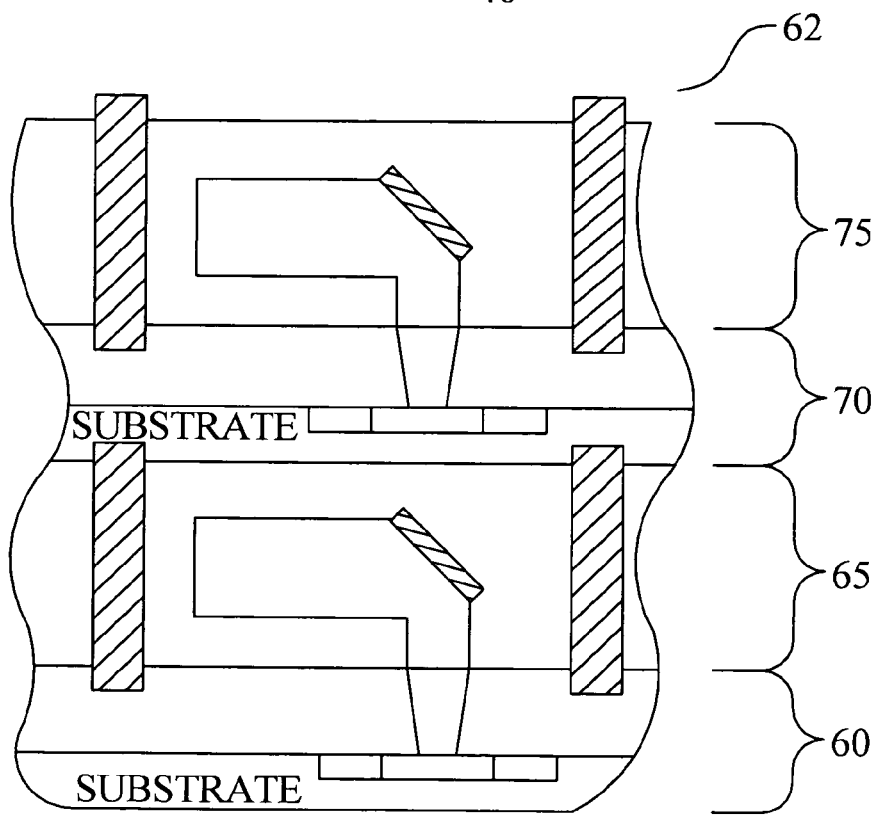
FIG. 7 illustrates the first preferred embodiment of the present invention wherein the multiple wafer structure is extended to greater than two wafers.

After the photonic heterogeneous stack 55 is thermally bonded together, the temporary, second substrate 28 can be removed from the optical substrate 10. The second substrate 28 may be removed using an UV irradiation or tthermal process to melt out the glue that is bonding it to the optical wafer. Next is a clean step to remove any remaining glue on the top of the optical wafer. Further, an additional amount of the dielectric layer 14 may be removed such that the metal pillars 16 extend above 53 the top side 24 of the optical substrate 10. This step would allow a third substrate, with metal pads, to be thermally bonded onto the top side of the optical wafer 10. Referring now to FIG. 7, the wafer stacking concept may thus be extended to multiple wafers 60, 65, 70, and 75 thermally bonded together using the pillar and pad method of the present invention. The completed stack 62 shows a first electronics substrate 60 bonded to a first optical substrate 65, a second electronics substrate 70 bonded to the first optical substrate 65, and a second optical substrate 75 bonded to the second electronics substrate 70. Each substrate is added to the stack by alignment of pillars and pads and by thermal processing to cause metal diffusion bonding. The stack 62 is shown alternating between optical wafers 60 and 70 and electronics wafers 65 and 75 but any combination or sequence may be used.

Figure 8:
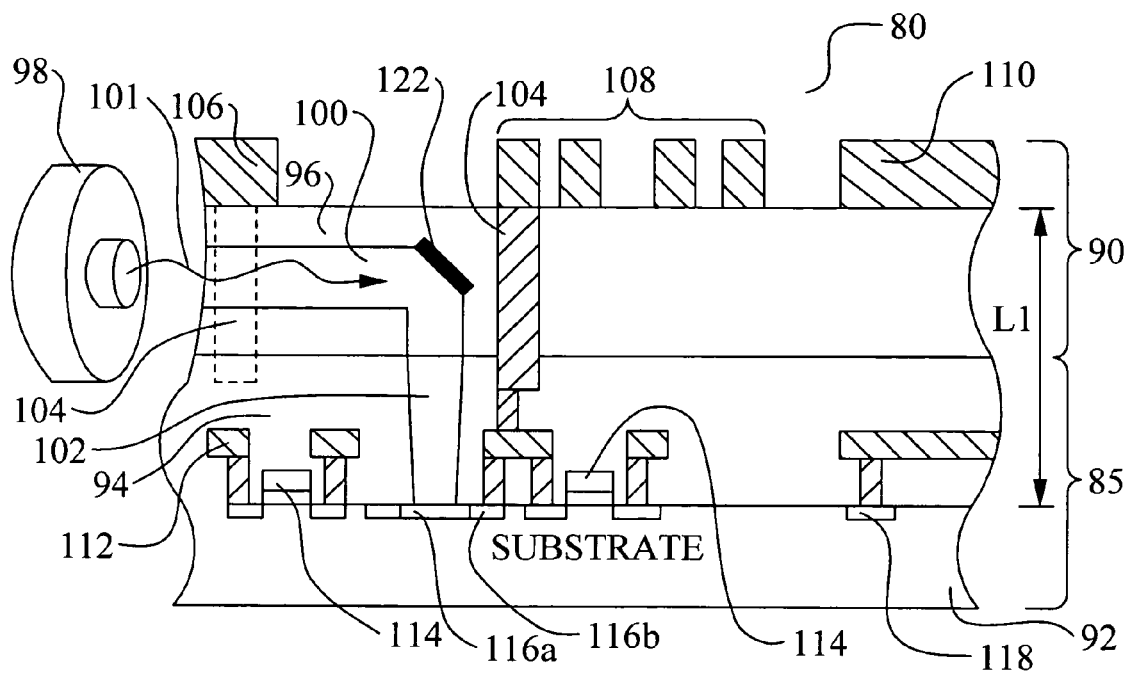
FIG. 8 illustrates a second preferred embodiment of the present invention showing a photonic receiver circuit

Referring now to FIG. 8, a second preferred embodiment of the present invention is illustrated. In this embodiment, the photonic heterogeneous wafer stacking technique is extended to create a photonic receiver circuit 80. An optical substrate 90 is stacked with and bonded to an electronics substrate 85. The optical substrate 95 comprises a dielectric layer 96, passive optical components 100 and 122, and metal pillars 104. The electronics substrate 85 comprises a semiconductor substrate 92, a dielectric layer 94, electronics devices 114, 116a, and 116b, and metal pads. The optical substrate 90 and the electronics substrate 85 are bonded together by thermally induced metallic diffusion between the metal pillars and the metal pads.

Further features of the second embodiment of the present invention are an optical waveguide 100 with an embedded mirror 122. The optical waveguide 100 aligns with a vertical waveguide 102 that is formed in the electronics substrate 85. As a further important feature, a light emitting, laser diode 98 is incorporated into the design 80. The laser diode 98 is aligned to the waveguide 100 such that light 101 emitted from the laser diode 98 is transmitted through the waveguide 100. This transmitted light 101 is reflected by the embedded mirror 122 and is thereby directed toward the vertical waveguide 102 in the electronics substrate 85. Finally, the transmitted light 101 strikes the photodetector 116a. The photodetector 116a generates an electrical signal based the intensity of the incident light 101.

Another important feature of the present invention is the formation of metal lines 110, 106, and 108 overlying the top surface of the optical substrate 90. In particular, electrical transmission lines 110, antennas 108, and bonding pads 106 are formed. With regards to optical/electronic transceiver performance, the design and the fabrication of the transmission lines 110 is of critical importance. The electronics substrate 85 uses a silicon substrate 92 for the formation of the active devices 114, 116a, 116b, and 118. As has been described above, the silicon substrate 92 represents a significant transmission loss at high frequencies of greater than about 5 GHz. In Akahori et al, cited above, a coplanar line loss of about 17 dB/cm is reported at 10 GHz for transmission lines formed overlying a silicon substrate with about 1.5 µm of dielectric layer therebetween. Such losses of electrical signal strength in the transmission lines are very critical in a photonic receiver design such as in the second embodiment because the photodetector 116a and 116b comprises either a silicon, silicon-germanium, or germanium device that has a relatively low output current when compared to a III-V (GaAs) detector. In addition, the transmission lines 110 can be quite long due to isolation of the photodetectors 116a from the transimpedance amplifiers.

It is further found that the loss due to the substrate 92 is reduced as the dielectric layer 94 and 96 thickness L1 increases. For about 10 µm of dielectric layer between the substrate and the transmission line, the loss is reduced to about 5.8 dB/cm. At about 30 µm, the loss is further reduced to only about 2.5 dB/cm at 10 GHz. Strip lines with a ground plane exhibit a loss of less than about 1 dB/cm at 10 GHz when the dielectric layer is about 30 µm. In the present invention, the combination of stacking substrates 85 and 90 and of forming the transmission lines 110 overlying the optical substrate 90 causes the resulting transmission lines 110 to be formed overlying the silicon substrate 92 with a dielectric layer 94 and 96 thickness of between about 25 µm and about 30 µm therebetween. Hence, low loss transmission lines 110 are "built-in" to the present invention. There is no need to create a technology or to retrofit process steps to accommodate for low loss transmission lines. Again, the present invention improves performance while reducing cost.

High frequency, RF passive components 108, such as antennas and inductors, are also easily formed on the surface of the optical substrate 90 due to the "built-in", very thick dielectric layer 94 and 96 between these components 108 and the underlying silicon substrate 92. Such RF devices provide the capability of sending and receiving bi-directional information to/from other devices in a wireless mode.

Figure 9:
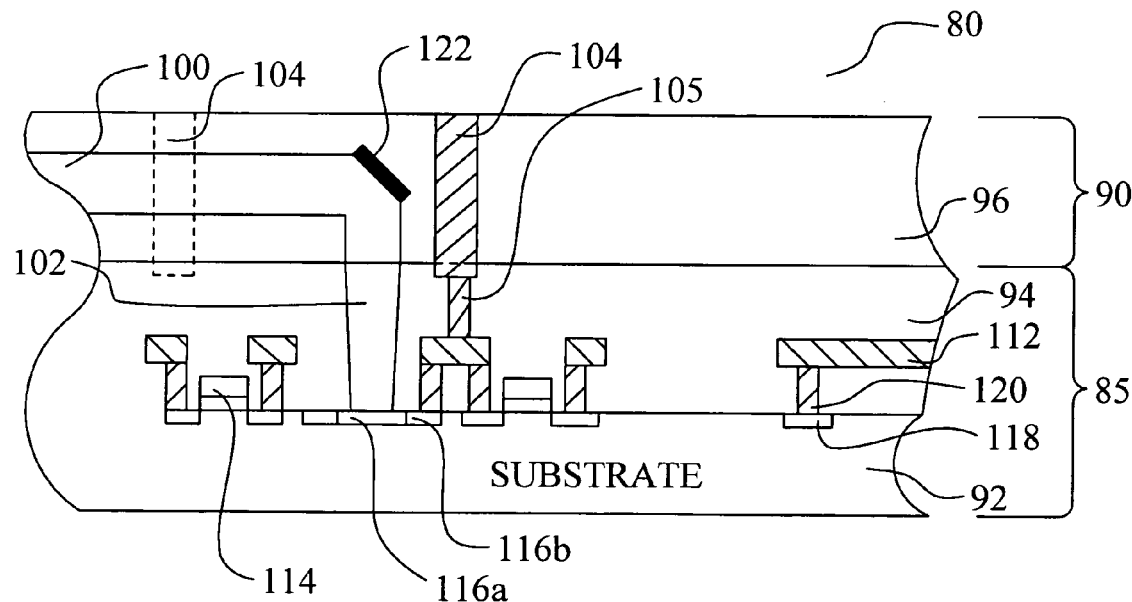
FIGS. 9 through 13 illustrate a third preferred embodiment of the present invention showing a photonic transceiver circuit wherein a laser photo diode is incorporated into the multiple wafer structure.

Referring now to FIGS. 9 through 13, a third preferred embodiment is illustrated. In this case, the fabrication steps for the photonic transceiver 80 are illustrated. In a photonic transceiver circuit, the laser, photodetector and electronic circuits are all fabricated together. Referring first to FIG. 9, the method begins with the bonding of the previously formed optical substrate 90 to the previously formed electronics substrate 85. Each substrate 90 and 85 is aligned and placed in contact one-to-another. The metal pillars 104 of the optical substrate 90 and the metal pads 105 of the electronics substrate 85 are then bonded together by thermal diffusion as described above to form the photonic heterogeneous stack 80.

Figure 10:
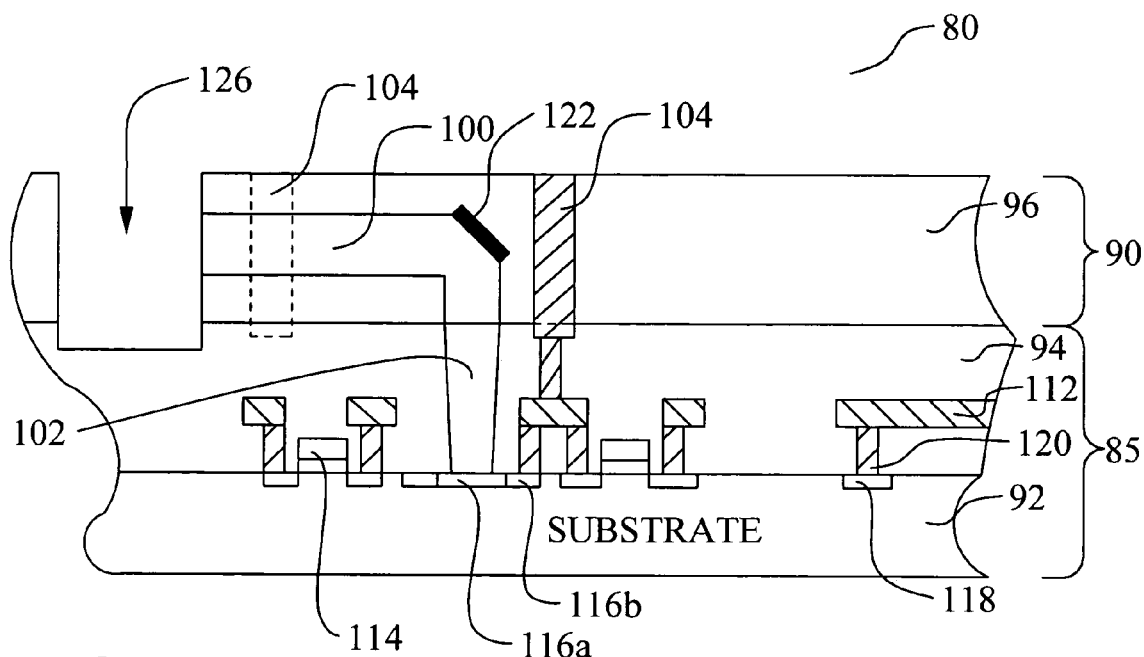

Referring now to FIG. 10, the photonic heterogeneous stack 80 is patterned to form an opening 126, or terrace, for the laser photo diode. The patterning is preferably performed by a lithography and etching sequence comprising, for example, depositing a photoresistive layer, not shown, overlying the photonic heterogeneous stack 80, exposing the photoresistive layer to actinic light through a mask, developing the photoresistive layer to transfer the masking pattern to the photoresistive layer and to thereby expose the photonic heterogeneous stack 80 where the opening 126 is planned, etching the photonic heterogeneous stack 80 to form the opening, and stripping away the remaining photoresistive layer. As a key feature, the opening 126 cuts through the optical waveguide 100 within the optical substrate 96.

Figure 11:
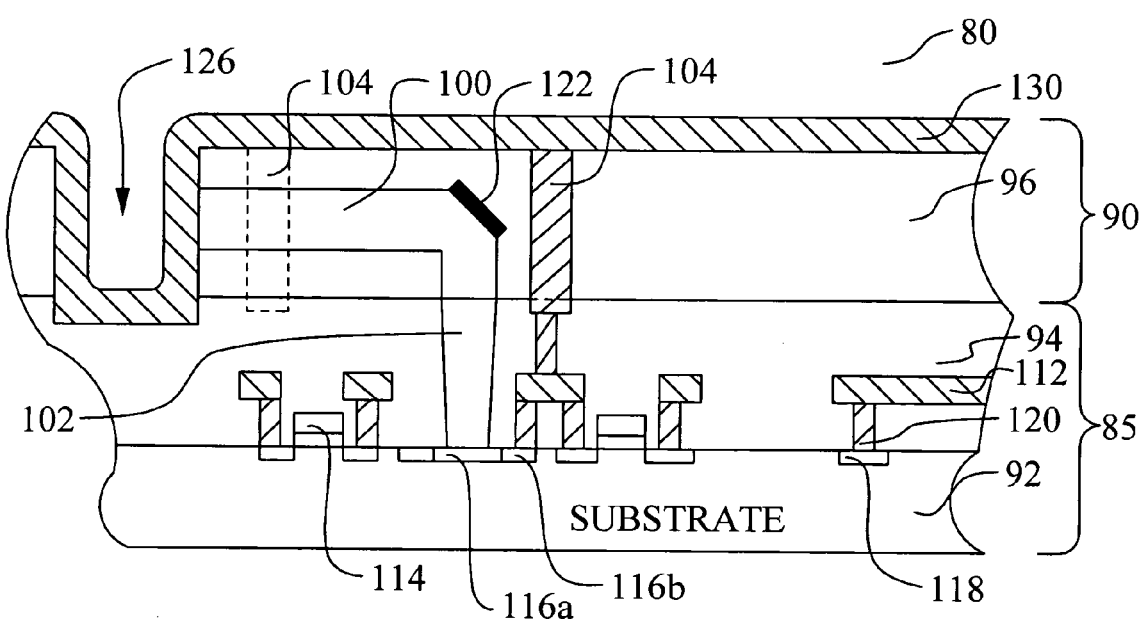
Figure 12:
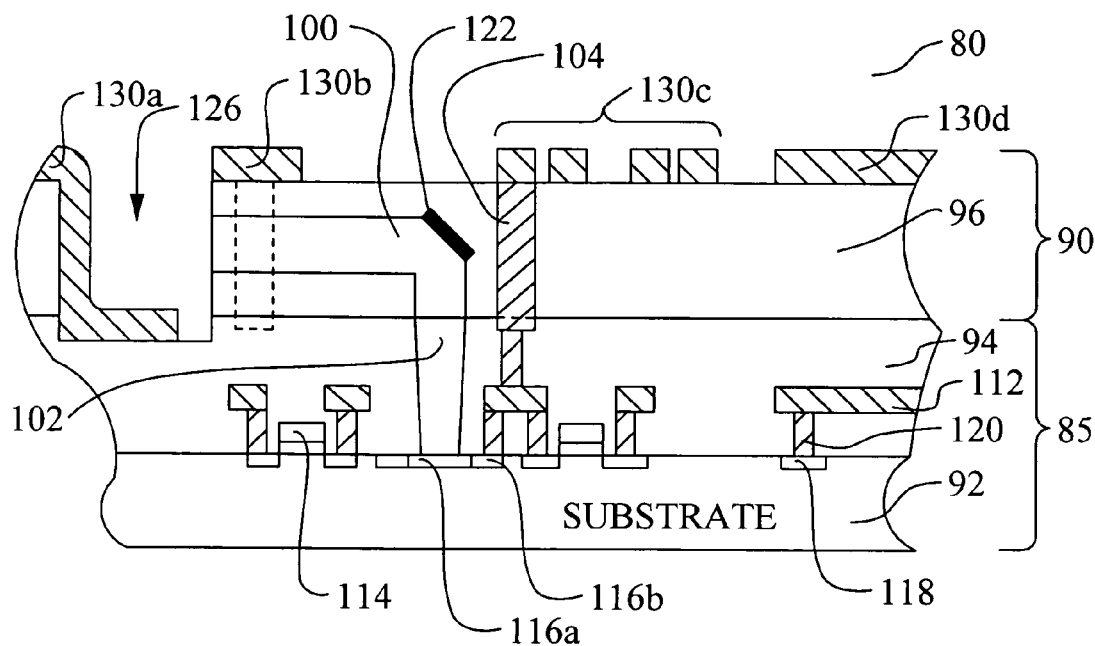
Figure 13:
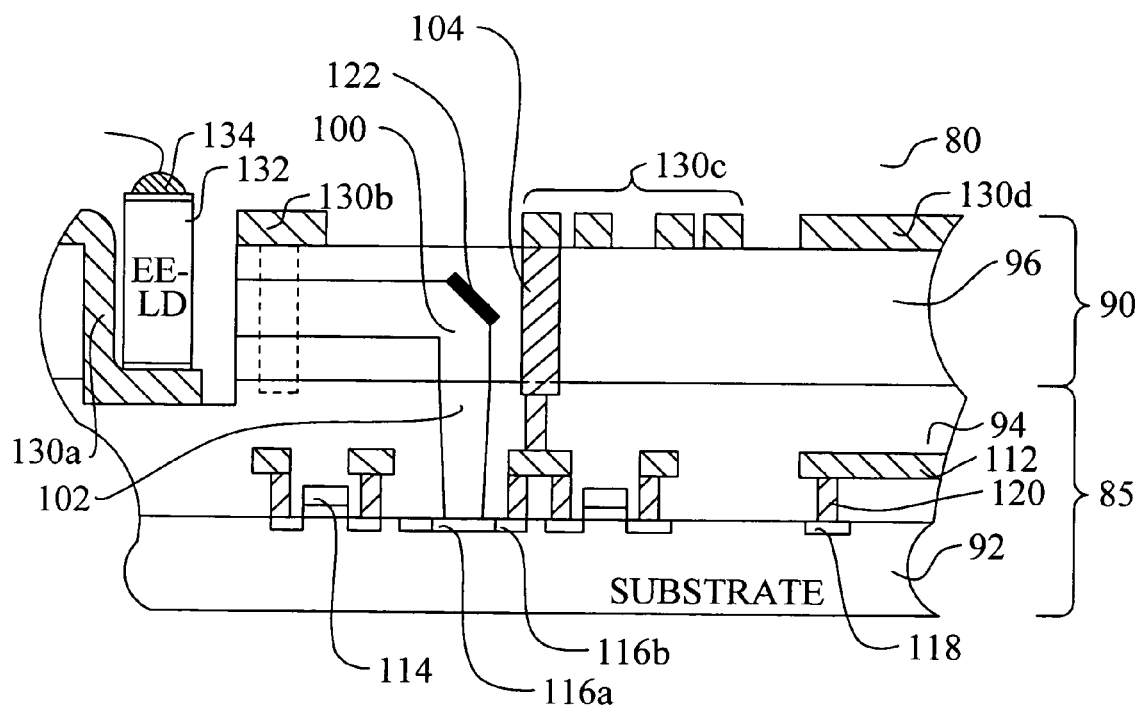

Referring now to FIG. 11, a metal layer 130 is deposited overlying the photonic heterogeneous stack 80 and lining the opening 126. For example, the metal layer 130 may comprise aluminum or copper that is deposited by physical vapor deposition (PVD). Referring now to FIG. 12, the metal layer 130 is patterned to form various features 130a, 130b, 130c, and 130d on the surface of the photonic heterogeneous stack 80. The patterning may comprise a lithography and etching sequence as described above. Note that this will work for both the photoreceiver IC, in FIG. 8, as well as the phototransceiver IC, in FIGS. 9 through 13. By comparison, a damascene process only works in the case of the photoreceiver IC, of FIG. 8. Alernatively, the metal layer 130 may be patterned using a damascene process wherein the dielectric layer 96 is first patterned to form openings and trenches, then the metal layer 130 is deposited, and then the metal layer 130 is planarized to confine the metal layer to the openings and trenches. Following the patterning step, bonding pads 130b, RF passive components 130c, and transmission lines 130d are completed. In addition, a lower electrode 130a for the laser photo diode 132 is formed. Finally, referring to FIG. 13 the laser photo diode 132 is fixably placed into the photonic heterogeneous stack 80 at the opening 126. The laser photo diode 132 may be attached 134 by solder reflow or by ultrasonic welding.

Figure 14:
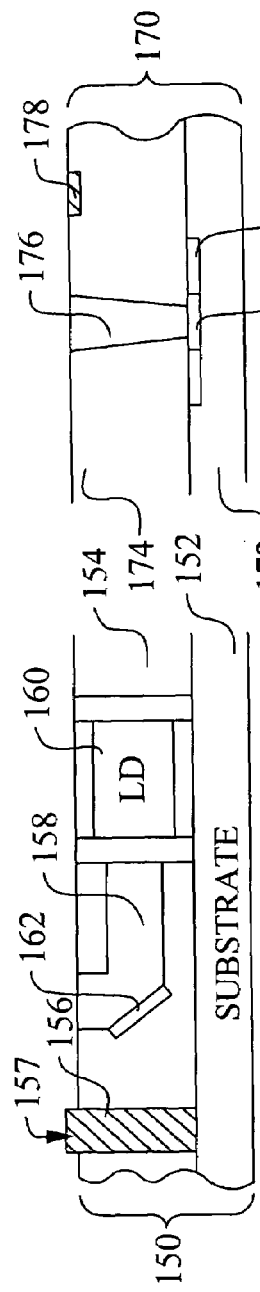
FIGS. 14 through 16 illustrates the third preferred embodiment of the present invention wherein the laser photo diode is incorporated at another part in the process.
Figure 15:
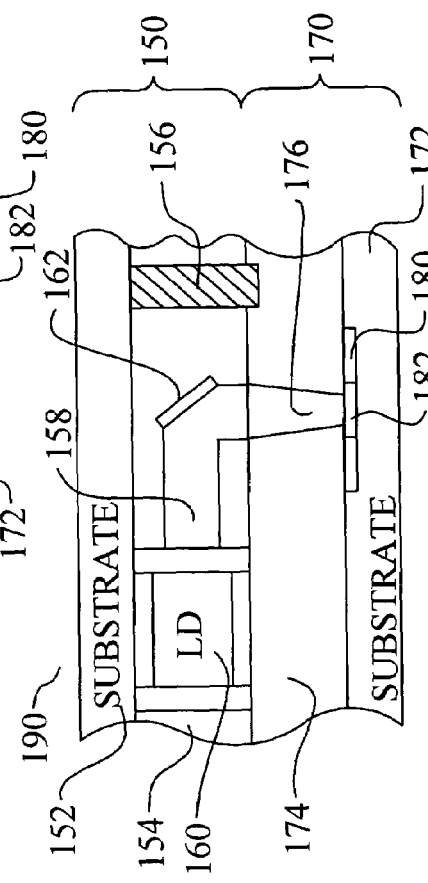
Figure 16:
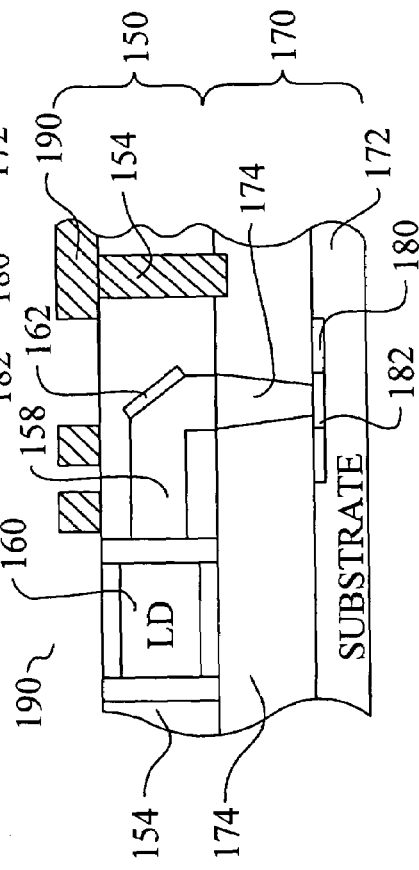

Referring now to FIGS. 14 through 16, an alternative method of forming a photonic transreceiver 190 is illustrated. Referring first to FIG. 14, in this case, the laser diode 160 is placed into the optical substrate 150 prior to the thermal bonding of the optical substrate 150 to the electronics substrate 170. Further, the laser diode 160 is placed into the optical substrate 150 after the high temperature, thermal processing, required to form the silica-based optical components, is completed. The optical substrate 150 again comprises a first substrate 152, optical components 158 and 162, a dielectric layer 154, and metal pillars 156 that extend above 157 the dielectric layer 154. The electronics substrate 170 again comprises electronics devices and photodetector 180 and 182, a semiconductor substrate 172, metal pads 178, and a vertical waveguide 176 formed in a dielectric layer 176. Referring now to FIG. 15, the optical substrate 150 and the electronics substrate 170 are aligned, placed into contact, and thermally bonded together. Referring now to FIG. 16, the first substrate 152 is removed. The metal layer 186 is deposited and patterned to form metal features 186 as in the prior case. Note that FIGS. 14 through 16, illustrate just one method of formation. As another method, the laser diode (LD) can be growth on Si through buffer of SiGe and Ge. Following a subsequent patterning and etch back, the trenches can be first filled with a cladding layer such as SiO2. Next, a core layer is formed and then patterned, and so on.

Figure 17:
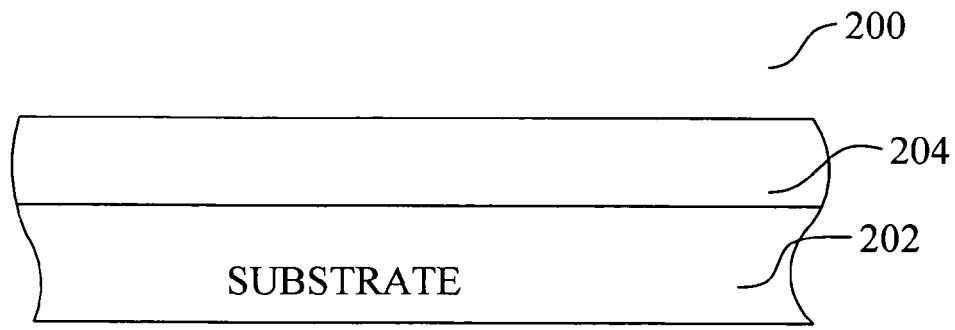

Referring now to FIGS. 17 through 19, 20a through 27a, and 20b through 27b, a third preferred embodiment of the present invention is illustrated. A method to form a waveguide with an embedded mirror for changing the direction of light transmitted in the waveguide is shown. Further important features of the present invention are shown. Referring first to FIG. 17, an optical substrate 200 is shown in simplified, cross sectional form. A first substrate 202 is provided. The first substrate 202 preferably comprises a semiconductor material and, more preferably, comprises silicon. A dielectric layer 204 is formed overlying the first substrate 202. The dielectric layer 204 preferably comprises, for example, silicon oxide. The dielectric layer 204 is preferably formed to a thickness of between about 0.5 µm and about 15 µm. The dielectric layer 204 acts as a lower cladding layer for the subsequently formed optical waveguides.

Figure 18:
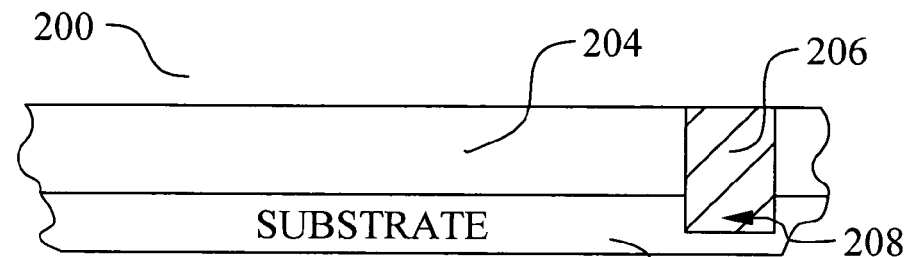
Figure 19:
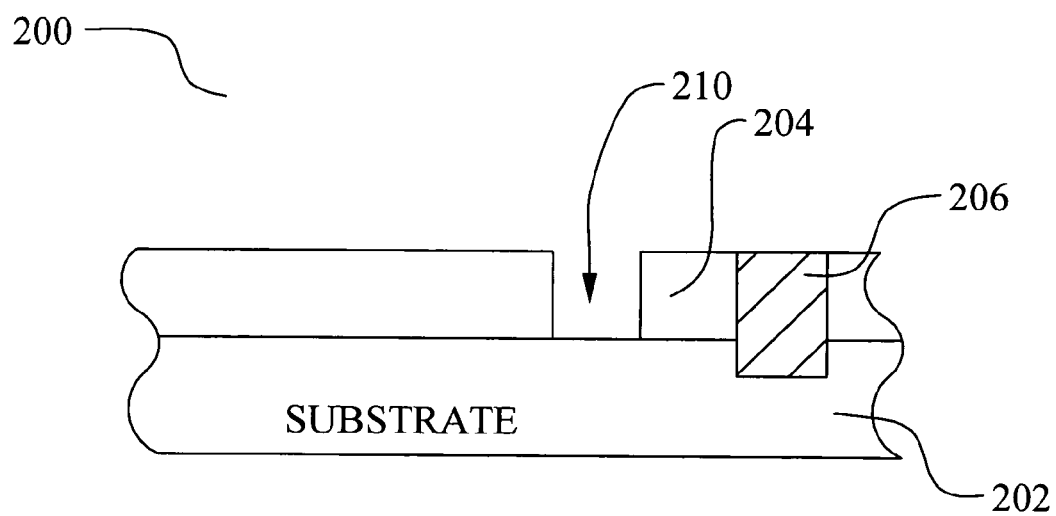

Referring now to FIG. 18, a single damascene copper process is now performed to form a part of the metal pillar 206. As a first step, a via opening is made through the dielectric layer 204 and into the underlying first substrate 202. A metal layer 206 is then deposited overlying the dielectric layer 204 and filling the via. The metal layer 206 is then planarized using, for example, a chemical mechanical polishing (CMP) process, to confine the metal layer 206 to the via opening as shown. Note that the partial metal pillar 206 extends down 208 into the first substrate 202. Referring now to FIG. 19, an opening 210 is made through the dielectric layer 204. The opening 210 is made where a right angle turn in the proposed waveguide is planned. Preferably, the opening 210 is made the same size as the planned waveguide or slightly larger.

Figure 20A:
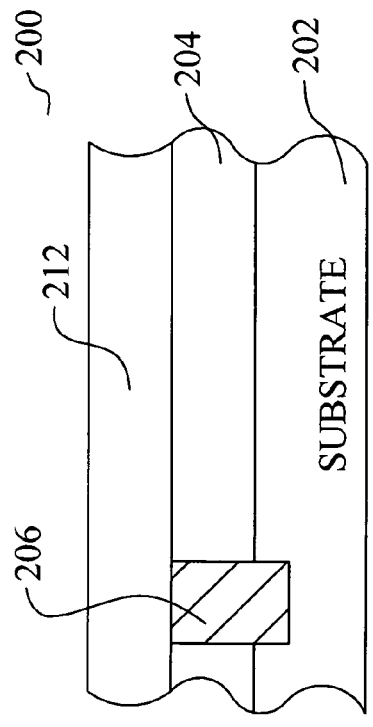
Figure 20B:
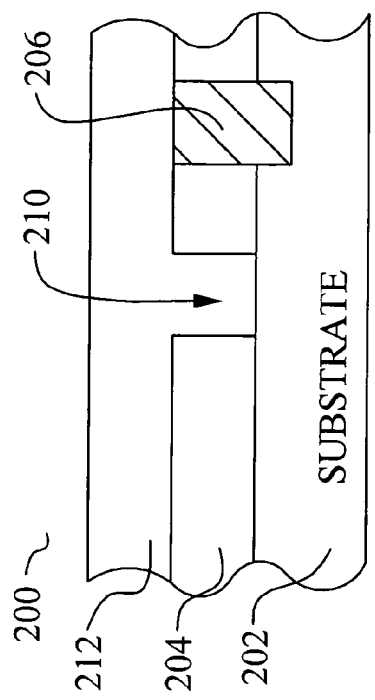

Referring now to FIGS. 20a and 20b, the optical substrate 200 is shown from two different cross sectional views. In FIGS. 20a through 27a, the waveguide is shown where the embedded mirror is formed to deflect the transmitted light downward. In FIGS. 20b through 27b, the waveguide is shown at alternative sections. A waveguide dielectric layer 212 is deposited overlying the dielectric layer 204, or lower cladding layer 204, and filling the opening 210. The waveguide dielectric layer 212 preferably comprises a material having a refractive index described by the constant n2 while the surrounding cladding dielectric layer 204 has a refractive index described by a constant n1. Here, n2 is greater than n1 such that light that is transmitted through the waveguide 212 will be confined in the waveguide. In this way, the waveguide 212 allows light to be transmitted through the optical substrate 200.

To these ends, the waveguide dielectric layer 212 preferably comprises a silica-based material. For example, silicon oxynitride ($SiO_xN_y$), silicon nitride ($Si_xN_y$), germanium doped silicon oxide ($SiO_2$), phosphorous doped silicon oxide, or silicon rich silicon oxide could be used for the waveguide 20. The waveguide dielectric layer 212 is deposited at a high temperature of in excess of about 700° C. More preferably, the waveguide dielectric layer 212 is deposited by high density plasma chemical vapor deposition (HDPCVD) or low-pressure chemical vapor deposition (LPCVD). The waveguide dielectric layer 212 fills the narrow gaps of the openings 210. The waveguide dielectric layer 212 is deposited to a thickness of between about 2,000 Å and about 80,000 Å, depending on the refractive index of the waveguides, i.e. thick for low index. Following the deposition, a planarization process is performed to smooth out any topography caused by the gap filling process. This planarization step may be performed using, for example, a CMP process.

Figure 21A:
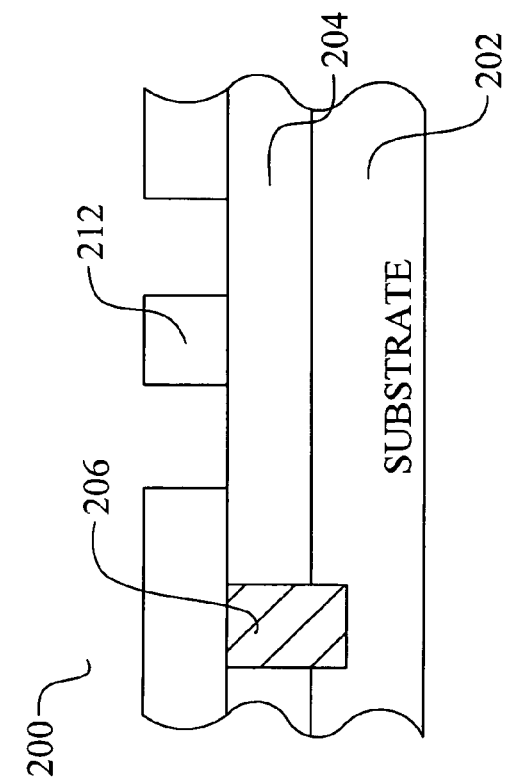
Figure 21B:
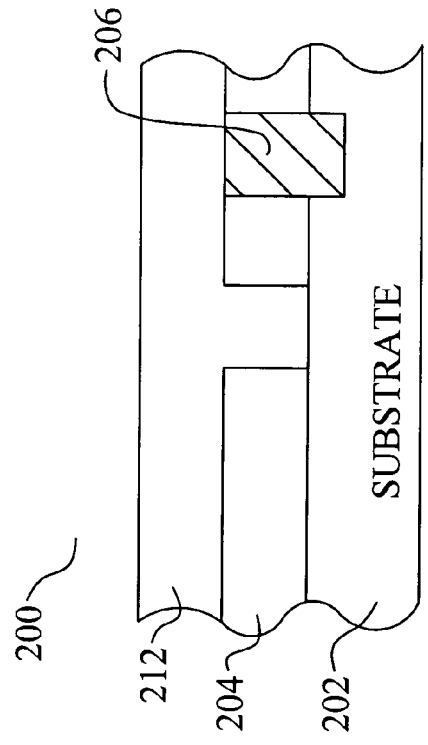

Referring now to FIGS. 21a and 21b, the waveguide dielectric layer 212 is patterned to form the waveguide shapes. This patterning step comprises, preferably, a lithography and etching sequence as described above. The patterned waveguide layer is depicted in FIG. 21b. It is critical that the etching process exhibits an anisotropic topography wherein very vertical edges are achieved to reduce polarization loss. Preferably, a dry etching process is used.

Referring now to FIGS. 22a and 22b, a patterned photoresist layer 214 is formed overlying the waveguide dielectric layer 212 and the cladding dielectric layer 204. The photoresist layer 214 is patterned using a lithographic method as described above. Alternatively, a hard masking layer may be deposited and then patterned by a lithography and etching sequence as described above. Most importantly to the present invention, the patterned photoresist layer 214 has openings 216 that expose the waveguide dielectric layer 212 at the locations where embedded mirrors are planned. The openings 216 may be made slightly larger depending on the etching process used. FIG. 22a shows where the photoresist layer 214 has an opening 216 for an embedded mirror, while FIG. 22b shows where no embedded mirrors are planned.

Referring now to FIGS. 23a and 23b, as an important feature, the waveguide dielectric layer 212 is now etched through where it is exposed by the photoresist layer 214. The etching process is not anisotropic, rather, it is a type of etch that generates an angled cross section 220. More particularly, the etching process creates an angle $\theta_m$ of about 45° with respect to the plane of the waveguide 212. Following the angled etch, the photoresist layer 214 is stripped away and a cleaning process is performed.

Referring now to FIGS. 24a and 24b, as a next important feature, a reflective metal layer 222 is deposited overlying the waveguide dielectric layer 212. The reflective metal layer 222 must exhibit good reflectivity and, more preferably, comprises gold (Au), copper (Cu), silver (Ag), or aluminum (Al).

The reflective metal layer 222 preferably is deposited to a thickness of between about 200 Å and about 1,000 Å. Referring now to FIGS. 25a and 25b, the reflective metal layer 222 is patterned to remove the reflective metal layer 222 from all areas excepting the angled area 220 of the waveguide dielectric layer 212 defined in the previous step. The remaining reflective metal layer 222 forms embedded mirrors at junctions where the light will make a downward, 90° turn in the waveguide 212. The patterning step may be performed using a lithography and etching sequence as described above. Following the patterning step, any photoresist is stripped, and the wafer is cleaned.

Referring now to FIGS. 26a and 26b, an upper cladding layer 224 is deposited overlying the waveguide dielectric layer 212 and the embedded mirror 222. The upper cladding layer 224, like the lower cladding layer 204, has a lower refractive index n3 than the waveguide dielectric layer 212. The upper cladding layer 224 preferably comprises silicon oxide. Referring now to FIGS. 27a and 27b, another copper damascene process is now performed to complete the metal pillars 226. Second vias are etched through the upper cladding layer 224 to the underlying metal layer 206. A second metal layer 226, preferably comprising copper metal, is then deposited overlying the upper cladding layer 224 and filling the second vias. The second metal layer 226 is then planarized to confine the second metal layer to the second vias and to complete the metal pillars 206 and 226. For example, a CMP process may be used to planarize the copper layer 226. It should be noted that the mask defining the first vias can be re-used for the second vias.

Figure 28:
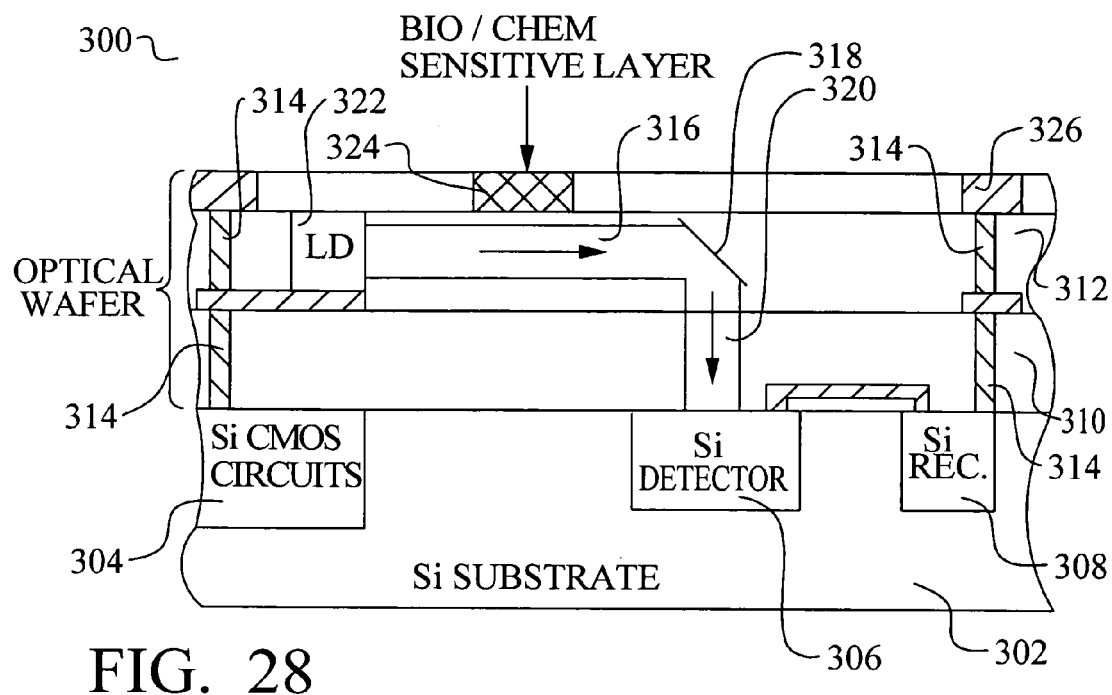
FIGS. 28, 29, 30a, and 30b illustrate a fifth preferred embodiment of the present invention showing a chemical or biological agent detector circuit fabricated using the novel method of forming a hybrid, optical and electronic integrated circuit device.

Referring now to FIGS. 28, 29, 30a, and 30b, a fifth preferred embodiment of the present invention is illustrated. In this embodiment, a chemical or biological agent detector circuit is fabricated using the novel method of forming a hybrid, optical and electronic integrated circuit device. Referring now to FIG. 28, a cross sectional view of the photonic heterogeneous optical-electronic device 300 is illustrated. The device 300 comprises, first, an electronics substrate 302 herein comprising silicon. In the substrate 302, silicon-based CMOS circuits 304 are formed. In addition, a photodetector 306 and receiver circuit 308 are formed in the silicon substrate 302. Second, an optical wafer is formed using the methods previously described in the present invention. The optical wafer comprises a thick dielectric layer or layers 310 and 312. Metal pillars 314 and pads 326 are formed through the optical wafer as in the other embodiments. A laser diode 322, a horizontal waveguide 316, an embedded mirror 318, and a vertical waveguide 320 are also formed in the optical wafer. The optical wafer and the electronics wafer are bonded together using the metal-diffusion bonding as described in previous embodiments to form the photonic heterogeneous device 300 shown. The resulting structure 300 guides light emitted from the laser diode (LD) 322 to the photodetector 306 in the silicon substrate 302.

Figure 29:
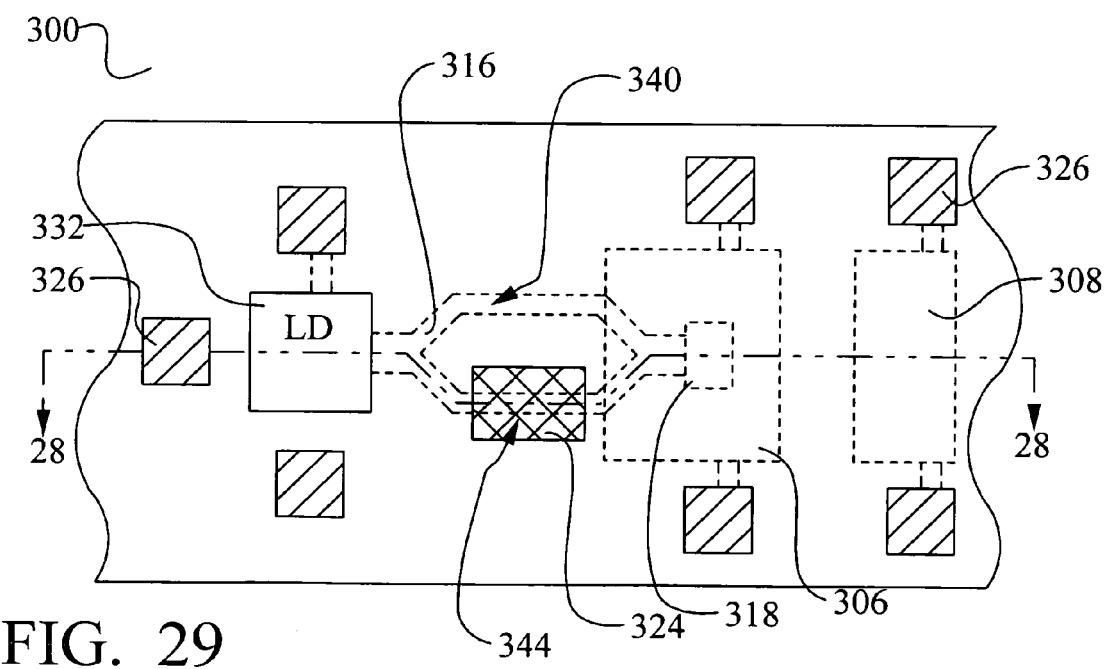

As an particularly important feature, an agent sensitive film 324 is formed overlying the cladding layer 312 in the area overlying the waveguide 316. The agent sensitive film 324 comprises a material that will interact with a biological or chemical agent such that the the photonic bandgap of the underlying waveguide is altered. Referring now to FIG. 29, a top view of the chemical or biological agent detector circuit is shown. In this embodiment, the waveguide 316 is split into two channels, or arms, 340 and 344. The top arm 316 is a reference arm where the agent sensitive layer 324 does not overlie the waveguide 316. The bottom arm 344 is the sensing arm where the agent sensitive layer 324 does overlie the waveguide 316.

Figure 30A:
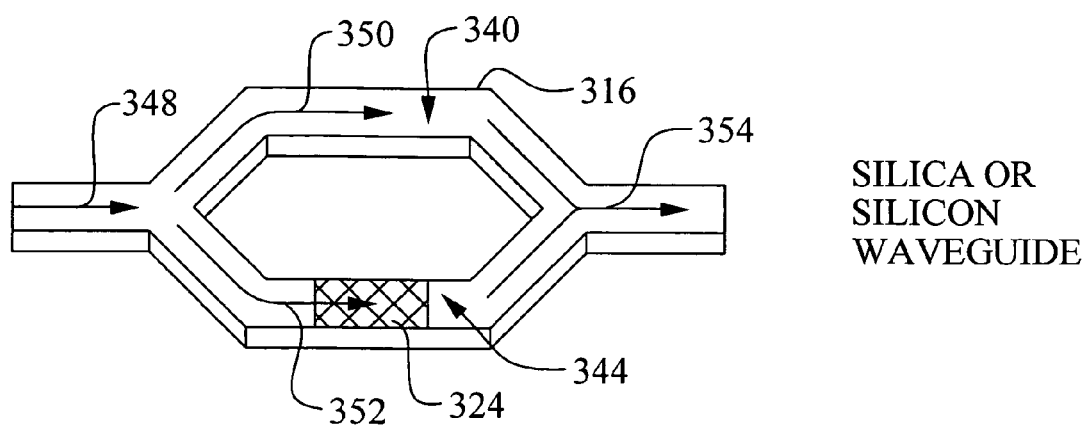
Figure 30B:
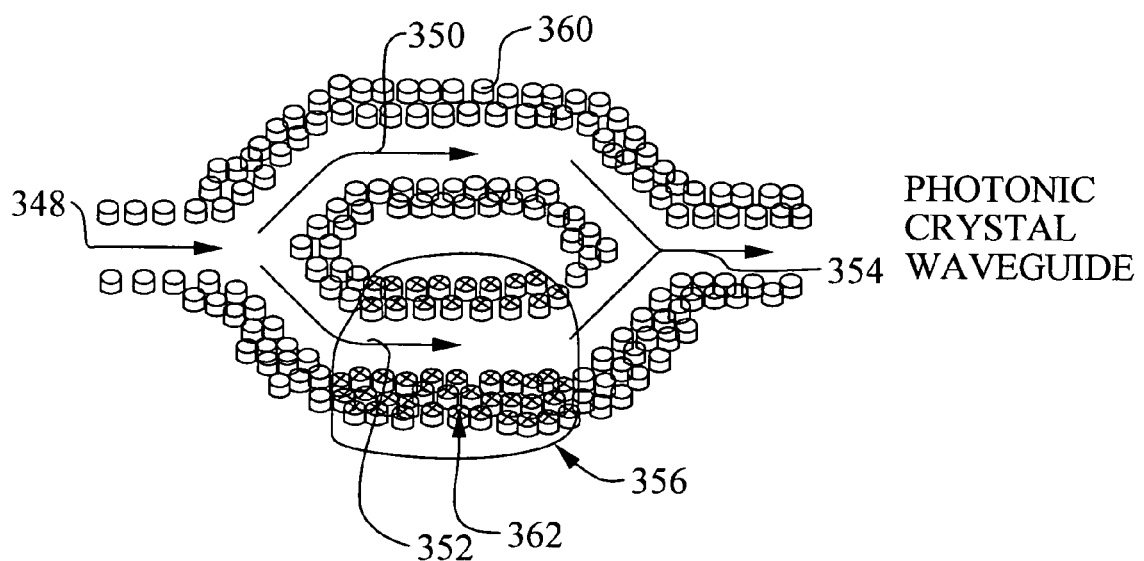

Referring now to FIG. 30a, a silica or silicon waveguide 316 is illustrated. The agent sensitive film 324 overlies the sensing arm 344 but not the reference arm 340. The light emitted 348 from the laser diode is split into reference light 350 and a sensing light 352. After traversing the reference arm 340 and the sensing arm 344, the light recombines 354. The combined light 354 can then be reflected by the embedded mirror 318 to the photodetector 306 and analyzed. Referring now to 30b, the waveguide is formed using photonic crystals 360. In this case, the chemical or biological material is trapped in holes 362 in the photonic crystals in the sensing arm 362.

The advantages of the present invention may now be summarized. An effective and very manufacturable method to integrate an optical substrate and an electronic substrate is achieved. The method integrates an optical substrate and an electronic substrate such that a heterogeneous, VLSI-photonic integrated circuit is formed. A heterogeneous, VLSI-photonic integrated circuit comprising complex functions and combining electronic/optic, optic/electronic, optic/optic, and electronic/electronic functions is achieved. The method improves the performance of the electrical interconnects and RF passive devices, such as inductors, through the use of built-in thick dielectric layers after substrates are stacked together. A method to form a waveguide with an embedded mirror in the manufacture of an integrated circuit device is achieved. The method forms a multiple level, stacked substrate device.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to form a VLSI-photonic heterogeneous system device, said method comprising:
   providing an optical substrate comprising at least one passive optical component formed therein wherein said optical substrate is a wafer comprising a plurality of die, wherein each said die comprises at least one said passive optical component;

providing an electronic substrate comprising at least one active electronic component formed therein wherein said electronic substrate is a wafer comprising a plurality of die, and wherein each said die comprises at least one said active electronic component;

forming a plurality of metal pillars through said optical substrate and protruding out a first surface of said optical substrate;

forming a plurality of metal pads on a first surface of said electronic substrate; and bonding together said optical substrate and said electronic substrate by a method further comprising:
aligning said first surfaces of said optical and electronic substrates such that said protruding metal pillars contact said metal pads; and
thermally treating said optical and electronic substrates such that said metal pillars bond to said metal pads.

2. The method according to claim 1 wherein said optical wafer and said electronic wafer each contain alignment marks so that said wafers can be accurately aligned one to another.

3. The method according to claim 1 wherein said electronic substrate comprises a photodetector device, wherein said optical substrate transmits an optical signal, and wherein a vertical waveguide transmits said optical signal through said electronic substrate to said photodetector device.

4. The method according to claim 1 wherein said passive optical component is a waveguide, a splitter, a multiplexer, a demultiplexer, an add/drop filter, a ring resonator, a waveguide optical switch, or a combination thereof.

5. The method according to claim 1 wherein said passive optical component is a thin film, a Si-based waveguide, a silica waveguide, a photonic crystal, or combinations thereof.

6. The method according to claim 1 wherein said active electronic component is a Si modulator, a trans-impedance amplifier, a clock recovery circuit, a laser driver circuit, a multiplexing circuit, a demultiplexing circuit, a radio frequency processing circuit, a baseband processing circuit, or a combination thereof.

7. The method according to claim 1 wherein said step of thermally treating is performed at a temperature of between about 100° C. and about 500° C.

8. The method according to claim 7 wherein said step of bonding together further comprises a pre-plasma surface treatment of said protruding metal pillars and said metal pads prior to said step of thermally treating.

9. The method according to claim 1 wherein said passive optical component comprises a waveguide and wherein said waveguide further comprises an embedded mirror.

10. The method according to claim 9 wherein said electronic substrate comprises:
a vertical waveguide; and
a photodetector device such that an optical signal path is formed through said optical substrate waveguide, to said embedded mirror, through said electronic substrate vertical waveguide, and to said photodetector.

11. The method according to claim 10 wherein said vertical waveguide and said optical substrate waveguide comprise the same material.

12. The method according to claim 1 further comprising:
etching said optical substrate after said step of bonding together such that said metal pillars protrude out of said optical substrate at a second surface opposite said electronic substrate;
providing a third substrate with metal pads on a first surface; and
bonding together said optical substrate and said third substrate by a method further comprising:
aligning said second surface of said optical substrate and said first surface of said third substrate such that said protruding metal pillars contact said metal pads; and
thermally treating said optical and third substrates such that said metal pillars bond to said metal pads.

13. The method according to claim 12 wherein said third substrate comprises either an electronic substrate comprising at least one active electronic component formed therein or an optical substrate comprising at least one passive optical component formed therein.

14. The method according to claim 9 wherein said embedded mirror is formed by a method comprising:
forming a cladding layer overlying a silicon layer on said optical substrate;
patterning said cladding layer to form openings through said cladding layer where said embedded mirror is planned;
depositing a waveguide layer overlying said cladding layer and filling said openings;
patterning said waveguide layer to define said waveguide wherein said patterning forms an angled edge where said waveguide layer is etched through to underlying said cladding layer;
depositing a metal layer overlying said waveguide; and
patterning said metal layer to remove said metal layer from said waveguide excepting at said angled edge of said waveguide wherein said metal layer forms an embedded mirror for said waveguide.

15. The method according to claim 14 wherein said step of patterning said cladding layer and said step of patterning said metal layer use the same photolithographic mask.

16. The method according to claim 14 further comprising depositing a second cladding layer overlying said waveguide.

17. The method according to claim 16 wherein said second cladding layer comprises a thickness of less than about 5,000 Å such that chemical or biological agents contacting said second cladding layer will affect evanescent light when an optical signal is transmitted in said waveguide.

18. The method according to claim 16 wherein said waveguide has parallel trenches or is based on a photonic crystal device and wherein chemical or biological agents will be trapped in said trenches or in holes in said waveguide or photonic crystal device to thereby affect evanescent light when an optical signal is transmitted in said waveguide.

19. The method according to claim 1 wherein said optical substrate comprises a silicon layer and a dielectric layer, wherein said dielectric layer contains said passive optical component, and wherein said dielectric layer is at said first surface, and further comprising removing said silicon layer from said dielectric layer after said step of bonding together said optical substrate and said electronic substrate.

20. The method according to claim 1 wherein said optical substrate comprises a thick dielectric layer and further comprising:

depositing a metal layer overlying said thick dielectric layer on the surface opposite said electronic substrate after said step of bonding together; and patterning said metal layer to form metal lines.

21. The method according to claim 20 wherein said metal lines form a low loss transmission line, an inductor, or an antenna.

22. The method according to claim 20 wherein said thick dielectric layer has a thickness of between about 10 µm and about 50 µm.

23. The method according to claim 1 wherein said passive optical component comprises a waveguide and further comprising:

patterning said optical substrate to form an opening through a part of said waveguide after said step of bonding together; and placing a laser diode in said opening such that light from said laser diode will enter said waveguide.

24. The method according to claim 23 wherein said waveguide further comprises an embedded mirror and wherein said electronic substrate comprises:

a vertical waveguide; and a photodetector device such that said laser diode light will be transmitted through said optical substrate waveguide, to said embedded mirror, through said electronic substrate vertical waveguide, and to said photodetector.

25. A VLSI- photonic heterogeneous system device, said device comprising:

an optical substrate comprising:

at least one passive optical component formed therein; and a plurality of metal pillars through said optical substrate and protruding out a first surface of said optical substrate; and an electronic substrate comprising:

at least one active electronic component formed therein; and a plurality of metal pads on a first surface of said electronic substrate wherein said first surfaces of said optical substrate and said electronic substrate are held together by the bonding between said metal pillars and said metal pads, and wherein said electronic substrate comprises a photodetector device, wherein said optical substrate transmits an optical signal, and wherein a vertical waveguide transmits said optical signal through said electronic substrate to said photodetector device.

26. The device according to claim 25 wherein said passive optical component comprises a waveguide, a splitter, a multiplexer, a demultiplexer, an add/drop filter, a ring resonator, or a waveguide optical switch.

27. The device according to claim 25 wherein said active electronic component comprises a Si modulator, a transimpedance amplifier, a clock recovery circuit, a laser driver circuit, a multiplexing circuit, a demultiplexing circuit, a radio frequency processing circuit, or a baseband processing circuit.

28. The device according to claim 25 wherein said passive optical component comprises a waveguide and wherein said waveguide further comprises an embedded mirror.

29. The device according to claim 28 wherein said electronic substrate comprises:

a vertical waveguide; and a photodetector device such that an optical signal path is formed through said optical substrate waveguide, to said embedded mirror, through said electronic substrate vertical waveguide, and to said photodetector.

30. The device according to claim 29 wherein said vertical waveguide and said optical substrate waveguide comprise the same material.

31. The device according to claim 25 further comprising a third substrate comprising a plurality of metal pads on a first surface of said third substrate wherein a second surface of said optical substrate, opposite from said electronic substrate, and said first surface of said third substrate are held together by the bonding between said metal pillars and said third substrate metal pads.

32. The method according to claim 31 wherein said third substrate comprises either an electronic substrate comprising at least one active electronic component formed therein or an optical substrate comprising at least one passive optical component formed therein.

33. The device according to claim 25 wherein said optical substrate is a wafer comprising a plurality of die, wherein each said die comprises at least one said passive optical component, wherein said electronic substrate is a wafer comprising a plurality of die, and wherein each said die comprises at least one said active electronic component.

34. The device according to claim 33 wherein said optical wafer and said electronic wafer each contain alignment marks so that said wafers can be accurately aligned one to another.

35. The device according to claim 28 wherein said embedded mirror is formed by a method comprising:

forming a cladding layer overlying a silicon layer on said optical substrate;

patterning said cladding layer to form openings through said cladding layer where said embedded mirror is planned;

depositing a waveguide layer overlying said cladding layer and filling said openings;

patterning said waveguide layer to define said waveguide wherein said patterning forms an angled edge where said waveguide layer is etched through to underlying said cladding layer;

depositing a metal layer overlying said waveguide;

patterning said metal layer to remove said metal layer from said waveguide excepting at said angled edge of said waveguide wherein said metal layer forms an embedded mirror for said waveguide; and depositing a second cladding layer overlying said waveguide.

36. The device according to claim 35 wherein said second cladding layer comprises a thickness of less than about 5,000 Å such that chemical or biological agents contacting said second cladding layer will affect evanescent light when an optical signal is transmitted in said waveguide.

37. The method according to claim 35 wherein said waveguide has parallel trenches or is based on photonic crystal device and wherein chemical or biological agents will be trapped in said trenches or in holes in said waveguide or photonic crystal device to thereby affect evanescent light when an optical signal is transmitted in said waveguide.

38. The device according to claim 25 wherein said optical substrate further comprises:

a thick dielectric layer; and patterned metal lines overlying said thick dielectric layer on the surface opposite said electronic substrate.

39. The device according to claim 38 wherein said patterned metal lines form a low loss transmission line, an inductor, or an antenna.

40. The device according to claim 39 wherein said thick dielectric layer has a thickness of between about 10 µm and about 50 µm.

41. The device according to claim 25 wherein said optical substrate further comprises:
a waveguide; and
a laser diode in an opening in said optical substrate and aligned such that that light from said laser diode will enter said waveguide.

42. The device according to claim 41 wherein said waveguide further comprises an embedded mirror and wherein said electronic substrate comprises:
a vertical waveguide; and
a photodetector device such that said laser diode light will be transmitted through said optical substrate waveguide, to said embedded mirror, through said electronic substrate vertical waveguide, and to said photodetector.

43. The device according to claim 41 wherein said waveguide is based on a photonic crystal device.

44. A method to form a VLSI-photonic heterogeneous system device, said method comprising:
providing an optical substrate comprising at least one passive optical component formed therein;
providing an electronic substrate comprising at least one active electronic component formed therein;
forming a plurality of metal pillars through said optical substrate and protruding out a first surface of said optical substrate;
forming a plurality of metal pads on a first surface of said electronic substrate;
bonding together said optical substrate and said electronic substrate by a method further comprising:
aligning said first surfaces of said optical and electronic substrates such that said protruding metal pillars contact said metal pads; and
thermally treating said optical and electronic substrates such that said metal pillars bond to said metal pads;
thereafter etching said optical substrate such that said metal pillars protrude out of said optical substrate at a second surface opposite said electronic substrate;
providing a third substrate with metal pads on a first surface; and
bonding together said optical substrate and said third substrate by a method further comprising:
aligning said second surface of said optical substrate and said first surface of said third substrate such that said protruding metal pillars contact said metal pads; and
thermally treating said optical and third substrates such that said metal pillars bond to said metal pads.

45. The method according to claim 44 wherein said optical substrate is a wafer comprising a plurality of die, wherein each said die comprises at least one said passive optical component, wherein said electronic substrate is a wafer comprising a plurality of die, and wherein each said die comprises at least one said active electronic component.

46. The method according to claim 45 wherein said optical wafer and said electronic wafer each contain alignment marks so that said wafers can be accurately aligned one to another.

47. The method according to claim 44 wherein said electronic substrate comprises a photodetector device, wherein said optical substrate transmits an optical signal, and wherein a vertical waveguide transmits said optical signal through said electronic substrate to said photodetector device.

48. The method according to claim 44 wherein said passive optical component is a waveguide, a splitter, a multiplexer, a demultiplexer, an add/drop filter, a ring resonator, Of a waveguide optical switch, or a combination thereof.

49. The method according to claim 44 wherein said passive optical component is a thin film, a Si-based waveguide, a silica waveguide, a photonic crystal, or combinations thereof.

50. The method according to claim 44 wherein said active electronic component is a Si modulator, a trans-impedance amplifier, a clock recovery circuit, a laser driver circuit, a multiplexing circuit, a demultiplexing circuit, a radio frequency processing circuit, a baseband processing circuit, or a combination thereof.

51. The method according to claim 44 wherein said step of thermally treating is performed at a temperature of between about 100 °C and about 500 °C.

52. The method according to claim 51 wherein said step of bonding together further comprises a pre-plasma surface treatment of said protruding metal pillars and said metal pads prior to said step of thermally treating.

53. The method according to claim 44 wherein said passive optical component comprises a waveguide and wherein said waveguide further comprises an embedded mirror.

54. The method according to claim 53 wherein said electronic substrate comprises:
a vertical waveguide; and
a photodetector device such that an optical signal path is formed through said optical substrate waveguide, to said embedded mirror, through said electronic substrate vertical waveguide, and to said photodetector.

55. The method according to claim 54 wherein said vertical waveguide and said optical substrate waveguide comprise the same material.

56. The method according to claim 44 wherein said third substrate comprises either an electronic substrate comprising at least one active electronic component formed therein or an optical substrate comprising at least one passive optical component formed therein.

57. A method to form a VLSI-photonic heterogeneous system device,
said method comprising:
providing an optical substrate comprising at least one passive optical component formed therein wherein said passive optical component comprises a waveguide and wherein said waveguide further comprises an embedded mirror;
providing an electronic substrate comprising at least one active electronic component formed therein;
forming a plurality of metal pillars through said optical substrate and protruding out a first surface of said optical substrate;
forming a plurality of metal pads on a first surface of said electronic substrate;
bonding together said optical substrate and said electronic substrate by a method further comprising:
aligning said first surfaces of said optical and electronic substrates such that said protruding metal pillars contact said metal pads; and
thermally treating said optical and electronic substrates such that said metal pillars bond to said metal pads.

58. The method according to claim 57 wherein said optical substrate is a wafer comprising a plurality of die, wherein each said die comprises at least one said passive optical component, wherein said electronic substrate is a wafer comprising a plurality of die, and wherein each said die comprises at least one said active electronic component.

59. The method according to claim 58 wherein said optical wafer and said electronic wafer each contain alignment marks so that said wafers can be accurately aligned one to another.

60. The method according to claim 57 wherein said electronic substrate comprises a photodetector device, wherein said optical substrate transmits an optical signal, and wherein a vertical waveguide transmits said optical signal through said electronic substrate to said photodetector device.

61. The method according to claim 57 wherein said passive optical component is a waveguide, a splitter, a multiplexer, a demultiplexer, an add/drop filter, a ring resonator, a waveguide optical switch, or a combination thereof.

62. The method according to claim 57 wherein said passive optical component is a thin film, a Si-based waveguide, a silica waveguide, a photonic crystal, or combinations thereof.

63. The method according to claim 57 wherein said active electronic component is a Si modulator, a trans-impedance amplifier, a clock recovery circuit, a laser driver circuit, a multiplexing circuit, a demultiplexing circuit, a radio frequency processing circuit, a baseband processing circuit, or a combination thereof.

64. The method according to claim 57 wherein said step of thermally treating is performed at a temperature of between about 100 °C and about 500 °C.

65. The method according to claim 64 wherein said step of bonding together further comprises a pre-plasma surface treatment of said protruding metal pillars and said metal pads prior to said step of thermally treating.

66. The method according to claim 57 wherein said electronic substrate comprises:
   a vertical waveguide; and
   a photodetector device such that an optical signal path is formed through said optical substrate waveguide, to said embedded mirror, through said electronic substrate vertical waveguide, and to said photodetector.

67. The method according to claim 66 wherein said vertical waveguide and said optical substrate waveguide comprise the same material.

68. The method according to claim 57, after said bonding together said optical substrate and said electronic substrate, further comprising:
   etching said optical substrate such that said metal pillars protrude out of said optical substrate at a second surface opposite said electronic substrate;
   providing a third substrate with metal pads on a first surface; and
   bonding together said optical substrate and said third substrate by a method further comprising:
   aligning said second surface of said optical substrate and said first surface of said third substrate such that said protruding metal pillars contact said metal pads; and
   thermally treating said optical and third substrates such that said metal pillars bond to said metal pads.

69. The method according to claim 68 wherein said third substrate comprises either an electronic substrate comprising at least one active electronic component formed therein or an optical substrate comprising at least one passive optical component formed therein.

* * * * *